(12) United States Patent
Kuhn et al.

(10) Patent No.: US 8,266,092 B2
(45) Date of Patent: Sep. 11, 2012

(54) METHODS AND SYSTEMS FOR TARGET VALUE PATH IDENTIFICATION

(75) Inventors: Lukas D. Kuhn, Palo Alto, CA (US);
Tim Schmidt, Palo Alto, CA (US);
Robert Price, Palo Alto, CA (US);
Johan de Kleer, Los Altos, CA (US);
Rong Zhou, Cupertino, CA (US); Minh Binh Do, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 813 days.

(21) Appl. No.: 12/409,235

(22) Filed: Mar. 23, 2009

(65) Prior Publication Data

US 2010/0010952 A1     Jan. 14, 2010

Related U.S. Application Data

(60) Provisional application No. 61/079,456, filed on Jul. 10, 2008.

(51) Int. Cl.
*G06F 17/00* (2006.01)
*G06N 7/00* (2006.01)
*G06N 7/08* (2006.01)

(52) U.S. Cl. ........................................................ 706/55

(58) Field of Classification Search ......................... None
See application file for complete search history.

(56) References Cited

U.S. PATENT DOCUMENTS

| | | |
|---|---|---|
| 4,563,746 A | 1/1986 | Yoshida et al. |
| 5,006,992 A | 4/1991 | Skeirik |
| 5,009,833 A | 4/1991 | Takeuchi et al. |
| 5,023,045 A | 6/1991 | Watanabe et al. |
| 5,070,468 A | 12/1991 | Niinomi et al. |
| 5,127,005 A | 6/1992 | Oda et al. |
| 5,214,577 A | 5/1993 | Sztipanovitis et al. |
| 5,268,834 A | 12/1993 | Sanner et al. |
| 5,305,426 A | 4/1994 | Ushioda et al. |
| 5,315,502 A | 5/1994 | Koyama et al. |
| 5,486,995 A | 1/1996 | Krist et al. |
| 5,521,814 A | 5/1996 | Teran et al. |
| 5,581,459 A | 12/1996 | Enbutsu et al. |
| 5,586,021 A | 12/1996 | Fargher et al. |
| 5,587,930 A | 12/1996 | Hori et al. |
| 5,701,394 A | 12/1997 | Arita et al. |
| 5,748,496 A | 5/1998 | Takahashi et al. |
| 5,914,875 A | 6/1999 | Monta et al. |
| 6,012,152 A | 1/2000 | Douik et al. |

(Continued)

OTHER PUBLICATIONS

Nykanen, Matti et al; "Finding Paths with the Right Cost"; 1999; Springer-Verlag Berlin Heidelberg; STACS '99—Lecture Notes in Computer Science, vol. 1563/1999; pp. 345-355.*

(Continued)

*Primary Examiner* — Jeffrey A Gaffin
*Assistant Examiner* — Stanley K Hill
(74) *Attorney, Agent, or Firm* — Fay Sharpe LLP

(57) ABSTRACT

Target value search methods and systems are presented for solving a target value path problem to identify a path or paths in a graph in which a connection graph is created and upper and lower bound values are determined for each node in the connection graph, and a first best search is performed to identify a path or paths from a starting node to a goal node having a path value closest to the target value.

18 Claims, 16 Drawing Sheets

U.S. PATENT DOCUMENTS

| | | |
|---|---|---|
| 6,038,540 A | 3/2000 | Krist et al. |
| 6,113,256 A | 9/2000 | Bonissone et al. |
| 6,263,277 B1 | 7/2001 | Tanimoto et al. |
| 6,272,483 B1 | 8/2001 | Joslin et al. |
| 6,326,758 B1 | 12/2001 | Discenzo |
| 6,411,908 B1 | 6/2002 | Talbott |
| 6,415,276 B1 | 7/2002 | Heger |
| 6,560,552 B2 | 5/2003 | Shen et al. |
| 6,643,592 B1 | 11/2003 | Loman et al. |
| 6,651,048 B1 | 11/2003 | Agrawal et al. |
| 6,725,208 B1 | 4/2004 | Hartman et al. |
| 6,735,549 B2 | 5/2004 | Ridolfo |
| 6,764,267 B2 | 7/2004 | Hart et al. |
| 6,795,798 B2 | 9/2004 | Eryurek et al. |
| 6,795,799 B2 | 9/2004 | Deb et al. |
| 6,847,854 B2 | 1/2005 | Discenzo |
| 6,853,930 B2 | 2/2005 | Hayashi et al. |
| 6,879,973 B2 | 4/2005 | Skaanning et al. |
| 6,895,292 B2 | 5/2005 | Fromherz et al. |
| 6,898,475 B1 | 5/2005 | Ruml et al. |
| 6,907,381 B2 | 6/2005 | Hayashi et al. |
| 6,925,338 B2 | 8/2005 | Eryurek et al. |
| 6,947,797 B2 | 9/2005 | Dean et al. |
| 6,965,806 B2 | 11/2005 | Eryurek et al. |
| 6,965,887 B2 | 11/2005 | Huelsman et al. |
| 7,043,321 B2 | 5/2006 | Ruml et al. |
| 7,062,478 B1 | 6/2006 | Huelsman |
| 7,162,393 B1 | 1/2007 | Vacar et al. |
| 7,164,954 B2 | 1/2007 | Lefebvre et al. |
| 7,206,771 B2 | 4/2007 | Alvarez et al. |
| 7,216,018 B2 | 5/2007 | Zuo et al. |
| 7,230,736 B2 | 6/2007 | Fromherz |
| 7,233,405 B2 | 6/2007 | Fromherz |
| 7,346,404 B2 | 3/2008 | Eryurek et al. |
| 7,356,383 B2 | 4/2008 | Pechtl et al. |
| 7,433,743 B2 | 10/2008 | Pistikopoulos et al. |
| 7,451,003 B2 | 11/2008 | Chester et al. |
| 7,467,841 B2 | 12/2008 | Kamisuwa et al. |
| 7,469,185 B2 | 12/2008 | Mendrick et al. |
| 7,574,334 B2 | 8/2009 | Tiwari et al. |
| 7,689,309 B2 | 3/2010 | Zheng |
| 7,711,674 B2 | 5/2010 | Arthur et al. |
| 7,725,857 B2 | 5/2010 | Foltz et al. |
| 7,903,844 B2 | 3/2011 | Satonaga et al. |
| 7,937,175 B2 | 5/2011 | De Kleer et al. |
| 2002/0184176 A1 | 12/2002 | Fromherz et al. |
| 2004/0002776 A1 | 1/2004 | Bickford |
| 2004/0008820 A1 | 1/2004 | Schmitt |
| 2006/0064291 A1 | 3/2006 | Pattipatti et al. |
| 2006/0230313 A1 | 10/2006 | Grichnick et al. |
| 2007/0043607 A1 | 2/2007 | Howard et al. |
| 2007/0129834 A1 | 6/2007 | Howard et al. |
| 2008/0010230 A1 | 1/2008 | Smith et al. |
| 2008/0010522 A1 | 1/2008 | Uwatoko et al. |
| 2008/0039969 A1 | 2/2008 | Liu et al. |
| 2008/0062211 A1 | 3/2008 | Kamisuwa et al. |
| 2008/0071716 A1 | 3/2008 | Anderson et al. |
| 2008/0148257 A1 | 6/2008 | Ruml et al. |
| 2008/0215509 A1 | 9/2008 | Charlton |
| 2009/0043809 A1 | 2/2009 | Fakhouri et al. |
| 2009/0183777 A1 | 7/2009 | Herman et al. |
| 2009/0204234 A1 | 8/2009 | Sustaeta et al. |
| 2009/0204237 A1 | 8/2009 | Sustaeta et al. |
| 2009/0204245 A1 | 8/2009 | Sustaeta et al. |
| 2009/0204267 A1 | 8/2009 | Sustaeta et al. |
| 2009/0210081 A1 | 8/2009 | Sustaeta et al. |
| 2009/0228408 A1 | 9/2009 | Kaushal et al. |
| 2009/0240366 A1 | 9/2009 | Kaushal et al. |
| 2009/0265025 A1 | 10/2009 | Brown |
| 2010/0010654 A1 | 1/2010 | de Kleer et al. |
| 2010/0138026 A1 | 6/2010 | Kaushal et al. |
| 2010/0222897 A1 | 9/2010 | Qiao et al. |

OTHER PUBLICATIONS

Nykanen, Matt et al.; "The Exact Path Length Problem"; 2002; Elsevier Science; Journal of Algorithms 42; pp. 41-53.*

Faloutos, Chrisots et al.; "Connection Subgraphs in Social Networks"; 2004; Proceedings of the Workshop on Link Analysis, Counterterrorism, and Privacy (in conj. with SIAM International Conference on Data Mining); 12 pages.*

Faloutos, Chistos et al.; "Fast Discovery of Connection Subgraphs"; 2004; ACM; KDD'04; pp. 118-127.*

Ramakrishnan, Cartic et al.; "Discovering Informative Connection Subgraphs in Multi-relational Graphs"; 2005; ACM New York, NY; ACM SIGKDD Explorations Newsletter, vol. 7, Issue 2; pp. 56-63.*

European Search Report, EP 10 15 6820, Jul. 8, 2010.

EP Search Report, EP 09 16 4977, Sep. 25, 2009.

Lukas Kuhn, Tim Schmidt, Bob Price, Johan De Kleer, Rong Zhou and Minh Do, "Heuristic Search for Target-Value Path Problem", Palo Alto Research Center.

Minh Do and Wheeler Ruml, "Lessons Learned in Applying Domain-Independent Planning to High-Speed Manufacturing", Palo Alto Research Center, 2006.

Richard Dearden and Dan Clancy, "Particle Filters for Real-Time Fault Detection in Planetary Rovers", Research Institute for Advanced Computer Science, NASA Ames Research Center.

Patrick Haslum and Hector Geffner, "Heuristic Planning with Time and Resources", Department of Computer Science, Linkoping University, Sweden, Departamento de Computacion, Universidad Simon Bolivar, Venezuela.

Markus P.J. Fromherz, Daniel G. Bobrow, and Johan De Kleer, "Model-based Computing for Design and Control of Reconfigurable Systems", Palo Alto Research Center, Published in AI Magazine, Special Issue on Qualitative Reasoning, vol. 24, n. 4, 2003 pp. 120-130.

Roberto Cervoni, Amedeo Cesta, and Angelo Oddi, "Managing Dynamic Temporal Constraint Networks", National Research Council of Italy.

Rina Dechter and Judea Pearl, "Generalized Best-First Search Strategies and the Optimality of A". University of California, Los Angeles, California, Journal of the Association for Computing Machinery, vol. 32, No. 3, Jul. 1985, pp. 505-536.

Peter E. Hart, Nils J. Nilsson, and Bertram Raphael, "A Formal Basis for the Heuristic Determination of Minimum Cost Paths", IEEE Transactions of Systems Science and Cybernetics, vol. ssc-4. No. 2, Jul. 1968.

Arash Vahidi, Martin Fabian, Bengt Lennartson, "Generic Resource Booking Models in Flexible Cells", Control and Automation Laboratory Department of Signals and Systems, Chalmers University of Technology, 2001 IEEE.

Do, "Partial Satisfaction (Over-Subscription) Planning as Heuristic Search," 2004, Proceedings of KBCS-04.

de Kleer, "Diagnosing Multiple Faults," 1987, Artificial Intelligence, vol. 32, pp. 97-130.

Hamscher, "Issues in Model Based Troubleshooting," 1987, MIT A.I. Lab Memo 893.

Wu, "Scheduling with uncertain durations: generating B-robust scheduled using constraint programming.,"ICAPS 2006 Workshop on Constraint Satisfaction Techniques for Planning and Scheduling Problems, pp. 134-137.

Do, "Sapa: A Scalable Multi-objective Heuristic Metric Temporal Planner,"2003, Journal of Artificial Intelligence Research, pp. 155-194.

Do, "Improving the Temporal Flexibility of Position Constrained Metric Temporal Plans,"2003, Proceedings of ICAPS '03, pp. 42-51.

de Kleer, "Fundamentals of Model-Based Diagnosis,"2003, Proceedings of the 5th IFAC Symposium on Fault Detection, Supervision, and Safety of Technical Processes, pp. 25-36.

van den Briel, "Effective Approaches for Partial Satisfaction (Over-Subscription) Planning,"2004, In Ninteenth National Conference on Artificial Intelligence (AAAI), pp. 562-569.

Bacchus, "Graphical models for preference and utility," 1995, in Proceedings of UAI.

Smith, "Choosing Objectives in Over-Subscription Planning," 2004, Proceedings of ICAPs-04, pp. 393-401.

Hoffman, "FF: The fast-forward planning system," 2001, AI Magazine, vol. 22, No. 3, pp. 57-62.

Provan, "Model-Based Diagnosis and Control Reconfiguration for Discrete Event Systems: An Integrated Approach," 1999, Proceedings of the 38th Conference on Decision & Control, pp. 1762-1768.

Ruml, "On-line Planning and Scheduling for High-speed Manufacturing," 2005, ICAPS, pp. 30-39.

Verron, "A New Procedure Based on Mutual Information for Fault Diagnosis of Industrial Systems," published in Workshop on Advanced Control and Diagnosis, 2006.

Arora, R.; and Hsiao, M.S., "Enhancing SAT-based Bounded Model Checking Using Sequential Logic Implications", Aug. 2004, 17th Intl Conference on VLSI Design, ISBN 0-765-2072-3, IEEE Xplore Digital Library.

Basu, S. and Kumar, R., "Quotient-Based Control Synthesis for Partially Observed Non-Deterministic Plants with Mu-Calculus Specifications", Dec. 2007, Proceedings of the 46th IEEE Conference on Decision and Control, ISBN 1-4244-1498-9, IEEE Xplore Digital Library.

Darwiche, A., "Decomposable Negation Normal FOrm", Jul. 2001, Journal of the ACM, vol. 48, No. 4, pp. 608-647.

Deng, S.; Bian, J.; Wu, W.; Yang, X.; and Zhao, Y.; "EHSAT: an Efficient RTL Satisfiability Solver Using an Extended DPLL Procedure", Jun. 2007, Design Automation Conference 2007, ACM Online.

Elliot, P., "An Efficient Projected Minimal Conflict Generator for Projected Prime Implicate and Implicate Generation", Feb. 2004, Massachusetts Institute of Technology, Department of Aeronautics and Astronautics.

Gopalakrishnan, S; Durairaj, V. and Kall, P., "Integrating CNF and BDD Based SAT Solvers", Nov. 2003, 8th IEEE Intl High-Level Design Validation and Test Workshop, ISBN 0/7803-8236-6, IEEE Xplore Digital Libra.

Thittamaranahalli, S.K., "Contributions to Algorithmic Techniques in Automated Reasoning About Physical Systems", Mar. 2005, Stanford University, Department of Computer Science.

Voronov, A. and Akesson, K., "Supervisory Control Using Satisfiablity Solvers", May 2008, Proceedings for the 9th Intl Workshop on Discrete Event Systems, ISBN 1-4244-2593-8, IEEE Xplore Digital Library.

Vahidi, A.; Fabian, M. And Lennartson, B., "Generic Resource Booking Models in Flexible Cells", Sep. 2001, Proceedings of the 2001 IEEE Intl Symposium on Intelligent Control, ISBN 0-783-6722-7, IEEE Xplore Digital Library.

Patrick Haslum and Hector Geffner, "Heuristic Planning with Time and Resources", Department of Computer Science, Linkoping University, Sweden, Departmento de Computacion, Universidad Simon Bolivar, Venezuela.

Markus P.J. Fromherz, Daniel G. Bobrow, and Johan De Kleer, "Model-based computing for Design Control of Reconfigurable Systems", Palo Alto Research Center, Published in AL Magazine, Special Issue on Qualitative Reasoning, vol. 24, n. 4, 2003 pp. 120-130.

Roberto Cervoni, Amedeo Cesta, An Angelo Oddi, "Managing Dynamic Temporal Constraint Networks", National Research Council of Italy.

Rina Dechter and Judea Pearl, "Generalized Best-First Search Strategies and the Optimality of A", University of California, Los Angeles, California, Journal of the Association for Computing Machinery, vol. 32, No. 3, Jul. 1985, pp. 505-536.

EP Search Report, 10 15 6820.2, Aug. 7, 2010.

Peter E. Hart, "A formal basis for the heuristic determination of minimum cost paths", IEE Transactions of Systems Science and Cybernetics, SSC-4, No. 2, Jul. 1968.

EP Search Report, EP 09164978.0, Sep. 16, 2009.

* cited by examiner

METHODS AND SYSTEMS FOR TARGET VALUE PATH IDENTIFICATION

REFERENCE TO RELATED APPLICATION

This application claims priority to and the benefit of U.S. Provisional Patent Application Ser. No. 61/079,456, which was filed Jul. 10, 2008, entitled HEURISTIC SEARCH FOR TARGET-VALUE PATH PROBLEM, the entirety of which is hereby incorporated by reference.

BACKGROUND

The present exemplary embodiments relate to systems and methods for target value searching that can be used in a variety of settings such as online diagnosis for production planning systems and systems for providing consumers with targeted search results. Automated production planning systems may require selection of plant resources to produce a given product while intelligently employing certain production resources to obtain diagnostic information indicating the probability of particular resources being faulty. In this situation, the diagnostic goals of the planner may not be facilitated by simply selecting the shortest or fastest set of resources to build the product, but instead selecting a plan defining a sequence of resources that build the product while testing fault probabilities that are non-zero. In another example, consumers may desire a planner to identify vacation plans to a certain destination (or multiple prospective destinations) that have a certain duration (or range of durations, such as 5-7 days with start and end dates in a specified month) and that have a given target cost or cost range. Mapping systems may be required in a further application that can receive starting and ending locations, as well as a target distance and/or time values for planning a drive for viewing autumn leaves where the consumer wants a trip plan that lasts for 3-5 hours during daylight through parks in the month of October.

In the past, search problems were solved using minimization algorithms to find the shortest path or paths between a starting state and a goal state. However, the goal in certain applications is not necessarily to find paths with minimum length or cost, but instead the desired path has a non-zero or non-minimal cost or duration. Using shortest-path searching techniques in these situations involves identifying the shortest paths, and eliminating or exonerating those identified paths that do not fall within a target value range. The process would then be repeated until paths are identified that are within the desired range. This approach is impractical in most real-life applications, whereby a need exists for efficient target value path searching techniques and systems for use in identifying one or more paths having a value closest to a given target value.

BRIEF DESCRIPTION

The present disclosure provides systems and methods for identifying a path or paths in a graph having a value that is closest to a set target value. The disclosure finds utility in consumer preference searching systems, production planning systems that provide online diagnostics, and other applications in which paths having non-zero target values are to be identified.

In accordance with one or more aspects of the disclosure, a method is provided for identifying at least one path having a value closest to a target value. A starting graph is provided, which has a plurality of nodes representing states having at least one property value, and a plurality of edges between pairs of nodes, where each edge includes at least one positive directional weight value. The method includes constructing a successor graph at least partially according to the starting graph and a start node, and constructing a predecessor graph based at least partially on the starting graph and at least one goal node. A connection graph is constructed based at least partially on the successor and predecessor graphs, such as by forming the intersection of the predecessor and successor graphs in one example. Upper and lower bound values are then determined for each given node of the connection graph based at least partially on the weight values of all paths from the given node the goal node(s). A best first search is performed using the bound values to identify one or more paths from the start node to the goal node that has/have a value closest to a non-zero target value.

In accordance with further aspects of the disclosure, the bound values are determined by propagating backward from the goal node to the start node, and the target value search includes performing a node evaluation propagating forward from the start node to the goal node. The node evaluation may include generating a set of successor nodes for each given node n, and for each successor node of a given set, determining a successor node value according to the weight value of the edge from the given node n to the given successor node, evaluating a function F using an upper bound value and a lower bound value of the successor node, and retaining in the set one or more nodes for which the function F is zero or minimal, and removing all other successor nodes. The path or paths of interest are then identified from the start node to the goal node having a path value closest to a non-zero target value based at least partially on the successor node sets. The node evaluation for each given node n may also include selective pruning to speed up the best first search in accordance with still further aspects of the disclosure.

In accordance with other aspects of the disclosure, a system is provided for identifying at least one path having a value closest to a target value in a starting graph that includes a plurality of nodes representing states having at least one property value and a plurality of edges between pairs of nodes, each edge having at least one positive directional weight value. The system is comprised of a target value search component which includes a graph construction component operative to construct a connection graph based at least partially on the starting graph, a start node, and at least one goal node, as well as a computation component operative to determine upper and lower bound values for each given node of the connection graph based at least partially on the weight values of all paths from the given node to the at least one goal node. The search component also further includes a search component operative to perform a best first search using the upper and lower bound values to identify at least one path from the start node to the goal node having a path value closest to a non-zero target value. In one embodiment, the graph construction component constructs successor and predecessor graphs and then constructs the connection graph as the intersection of the successor and predecessor graphs.

The computation component in accordance with further aspects of the disclosure propagates backward from the goal node to the start node to determine upper and lower bound values along incoming edges to each given node n in the connection graph according to the weight value of the edge from the predecessor node m to the given node n. In other aspects of the disclosure, the search component performs a node evaluation for each given node n propagating forward from the start node to the goal node, which include generating a set of successor nodes for each given node n, and for each successor node of a given set, determining the successor node value. In this example, a function F is evaluated for each successor node of a given set, and nodes are retained in the set only if the function F is zero or minimal, with all other successor nodes being removed from the set. Using this set, the search component identifies the path(s) from the start node to the goal node having a value closest to the non-zero target value. The search component may further include a pruning component operative to selectively prune the set of successor nodes to speed up the best first search.

In accordance with further aspects of the disclosure, the starting graph is a belief model of a diagnosis engine of a model-based control system for constructing plans for operating a production plant to achieve one or more production goals. The starting graph includes a plurality of nodes representing a state of the production plant and a plurality of edges representing actions by one or more plant resources to transition the plant state from one graph node to another, with each edge having at least one positive directional weight value defining a failure probability associated with the action. The target value search component in this aspect of the disclosure is incorporated into the diagnosis engine and the search component performs a best first search to identify at least one production plan to achieve a given production goal that has a failure probability value closest to a non-zero target value, which is 0.5 in one example. In another aspect of the disclosure, the system is a consumer search system.

BRIEF DESCRIPTION OF THE DRAWINGS

The present subject matter may take form in various components and arrangements of components, and in various steps and arrangements of steps. The drawings are only for purposes of illustrating preferred embodiments and are not to be construed as limiting the subject matter.

DETAILED DESCRIPTION

Figure 1:
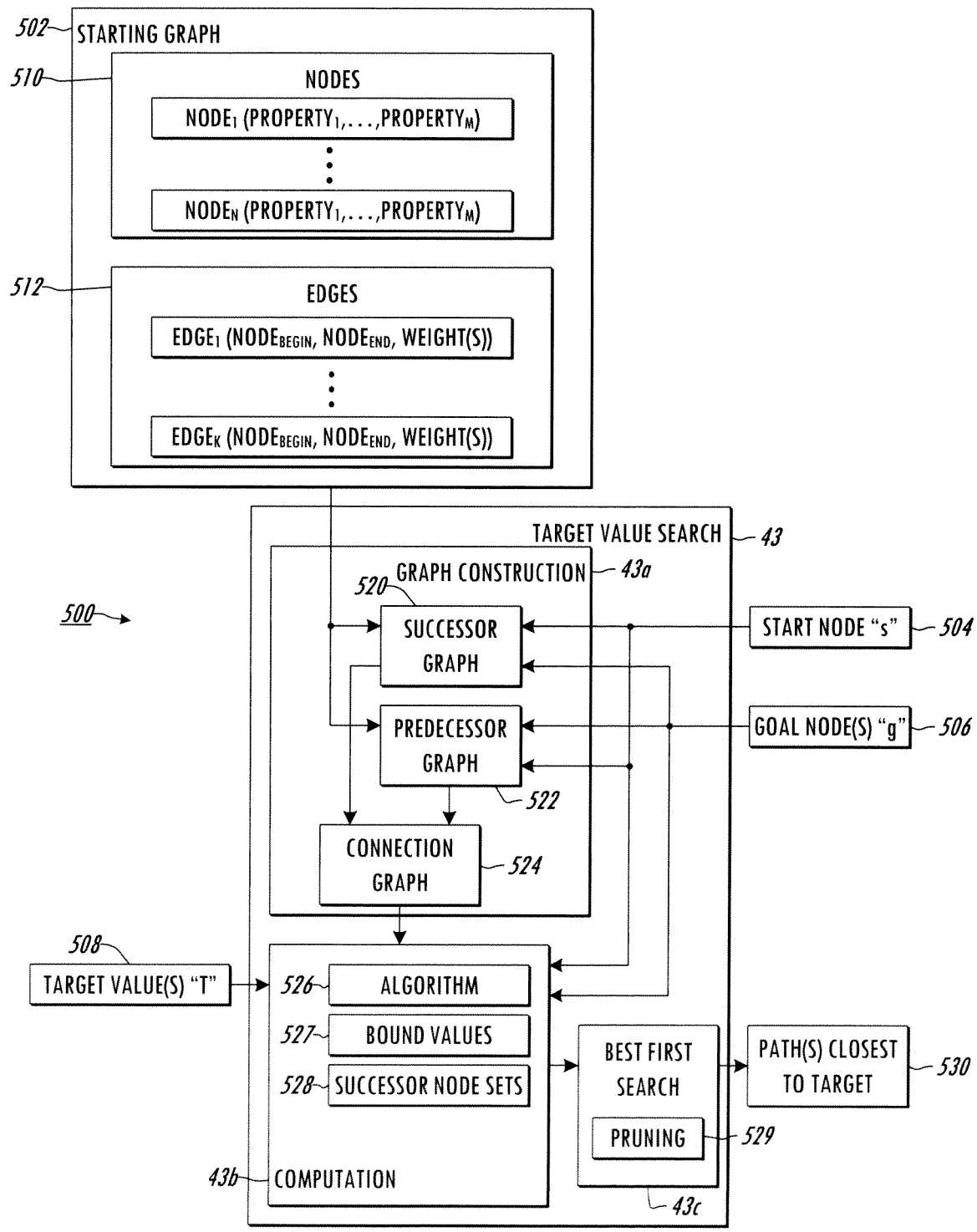
FIG. 1 is a schematic diagram illustrating an exemplary system for identifying at least one path having a value closest to a target value with a target value search component in accordance with one or more aspects of the present disclosure.

Referring now to the drawing figures, several embodiments or implementations of the present disclosure are hereinafter described in conjunction with the drawings, wherein like reference numerals are used to refer to like elements throughout, and wherein the various features, structures, and graphical renderings are not necessarily drawn to scale. The disclosure relates to target value search solutions and provides methods and systems to expeditiously identify paths through a graph from a start node to one or more goal nodes that have a path value that is closest to a non-zero target value T. The various aspects of the disclosure are of general applicability to any target value search problem and find particular utility in association with consumer search systems and production systems, and are described hereinafter in the context of exemplary document processing systems having various printing and document transport resources, although these particular applications are not restrictive of the uses of the described methods and systems.

Figure 2:
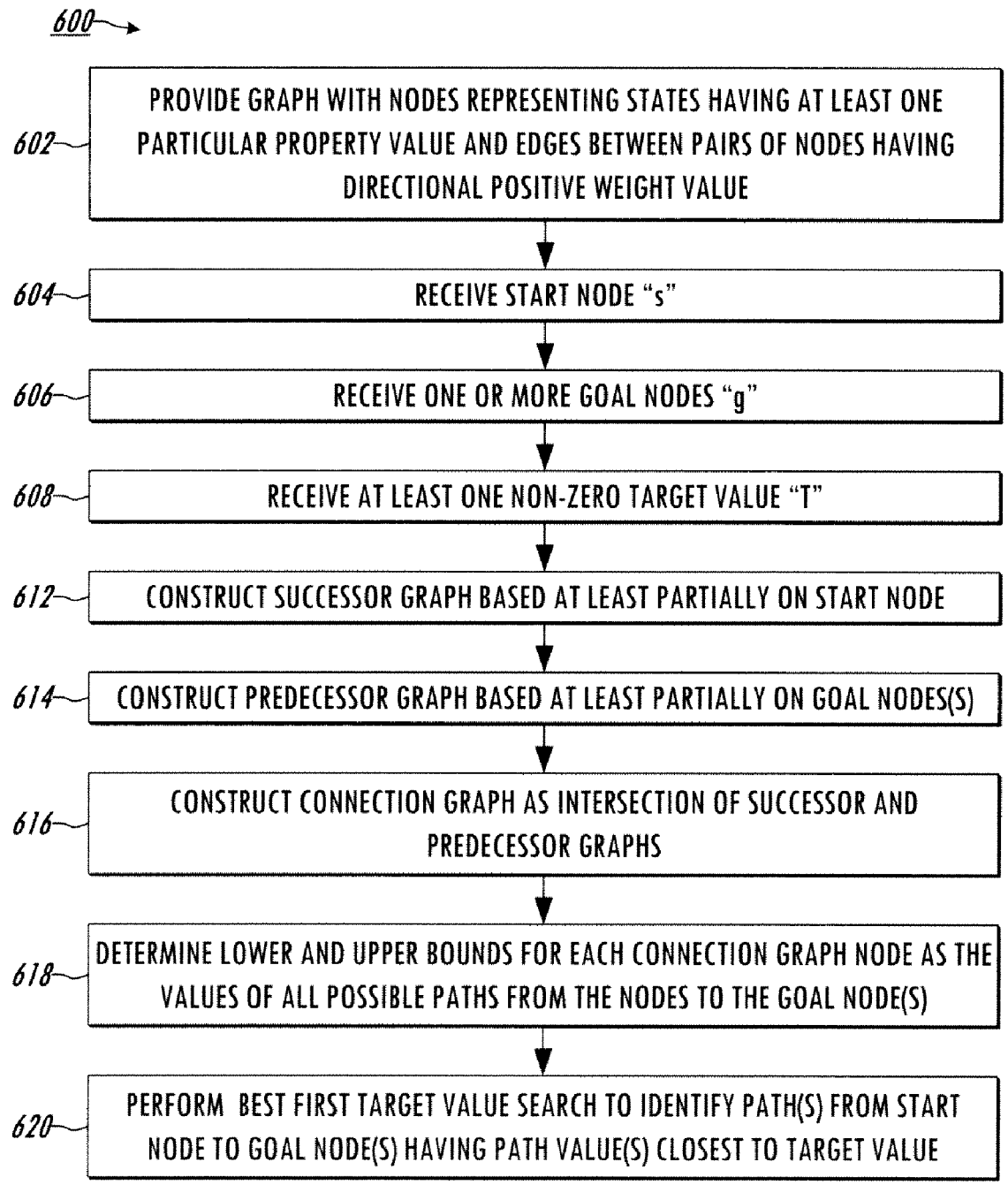
FIG. 2 is a flow diagram illustrating an exemplary method of identifying at least one path having a value closest to a target value in accordance with further aspects of the disclosure.
Figure 3:
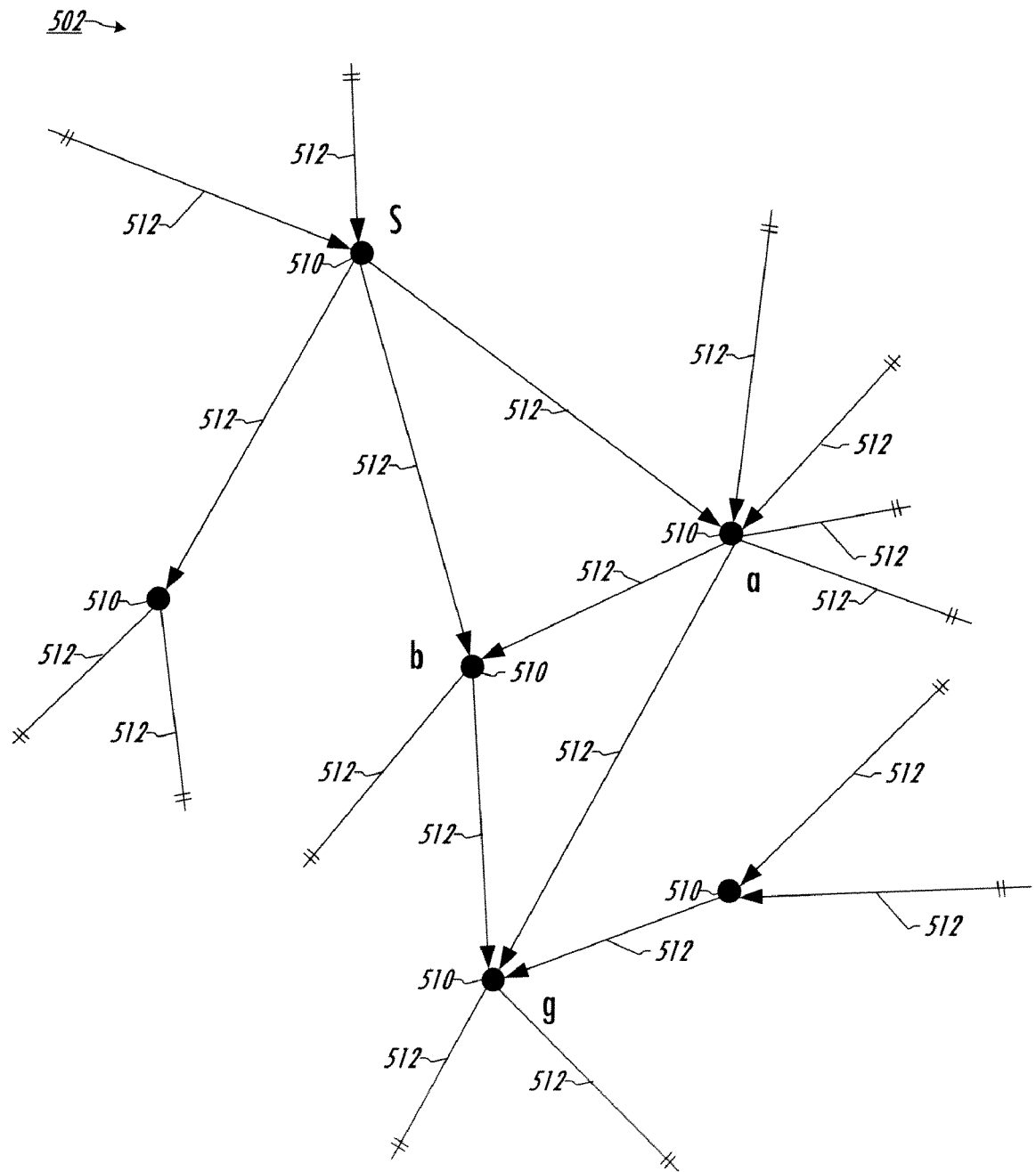
FIG. 3 is a schematic diagram partially illustrating an exemplary starting graph having nodes and edges including an exemplary start node and a goal node.

Referring initially to FIGS. 1-3, an exemplary system 500 is shown in FIG. 1 for identifying a path or paths having a value closest to a target value T that includes a target value search component 43 in accordance with one or more aspects of the present disclosure. FIG. 2 illustrates an exemplary method 600 for identifying the closest path to the target value, which may be implemented in the system 500 of FIG. 1 or in other systems. Although the method 600 is illustrated and described hereinafter in the form of a series of acts or events, it will be appreciated that the various methods of the disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated method 600 other methods of the disclosure may be implemented in hardware, software, or combinations thereof, such as in the exemplary system 500 of FIG. 1 and/or in the control system 2 described below in connection with FIGS. 11-13, and may be embodied in the form of computer executable instructions stored in a computer readable medium, such as in a memory operatively associated with the control system 2 in one example.

Figure 11:
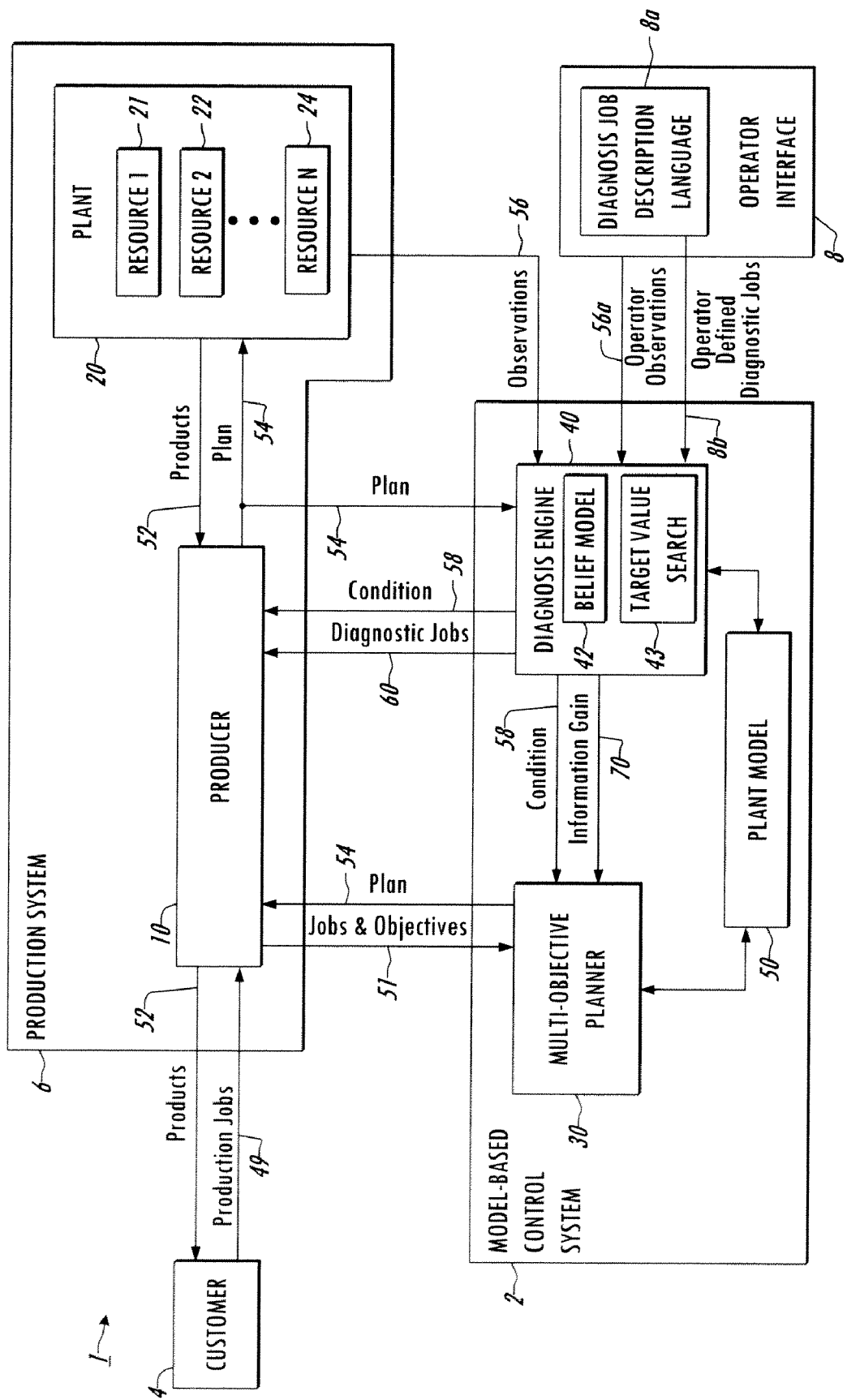
FIG. 11 is a schematic diagram illustrating a production system and an exemplary model-based control system with a planner, a plant model, and a diagnosis engine with a target value search system in accordance with one or more aspects of the disclosure.
Figure 12:
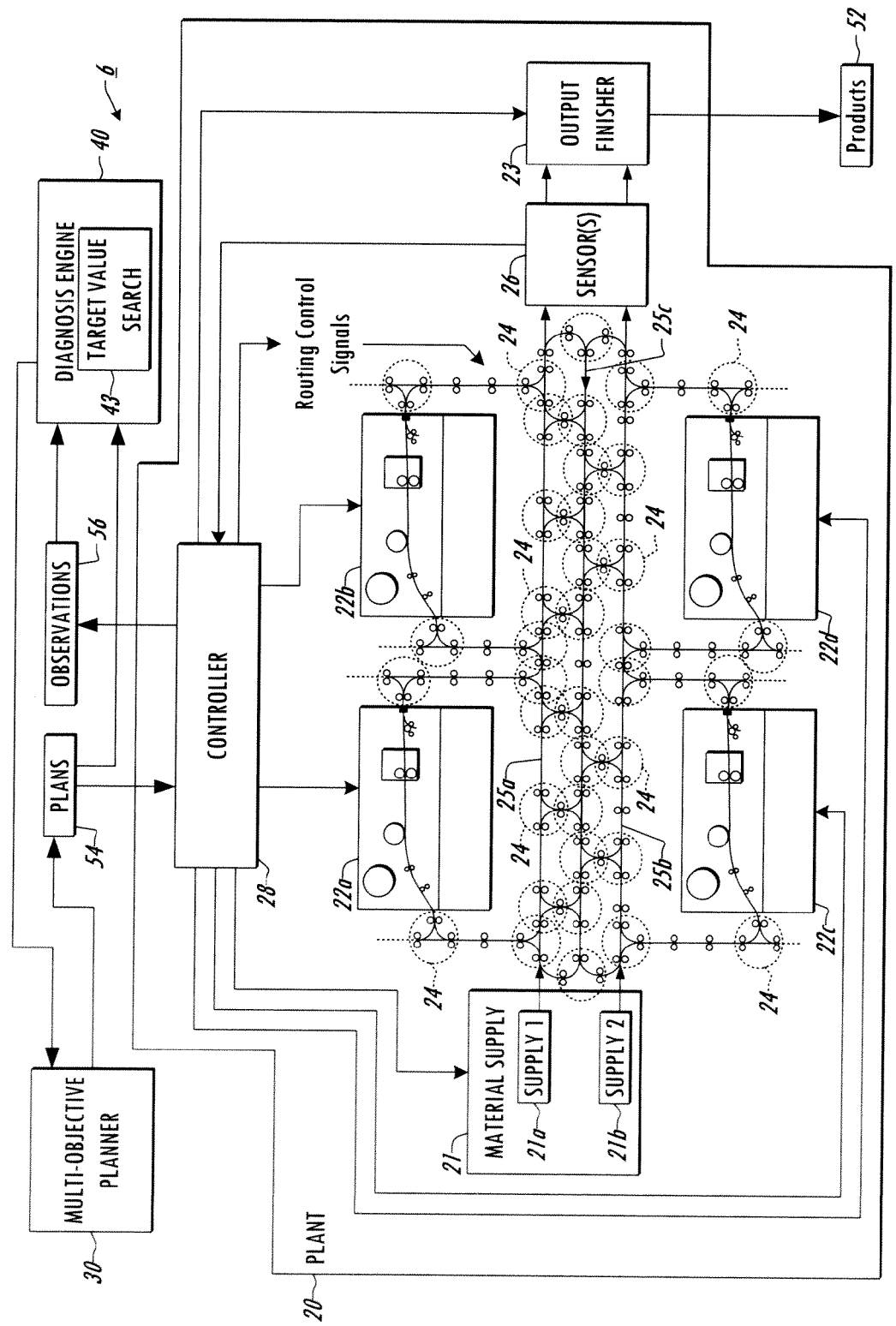
FIG. 12 is a schematic diagram illustrating further details of an exemplary modular printing system plant in the production system of FIG. 11.
Figure 13:
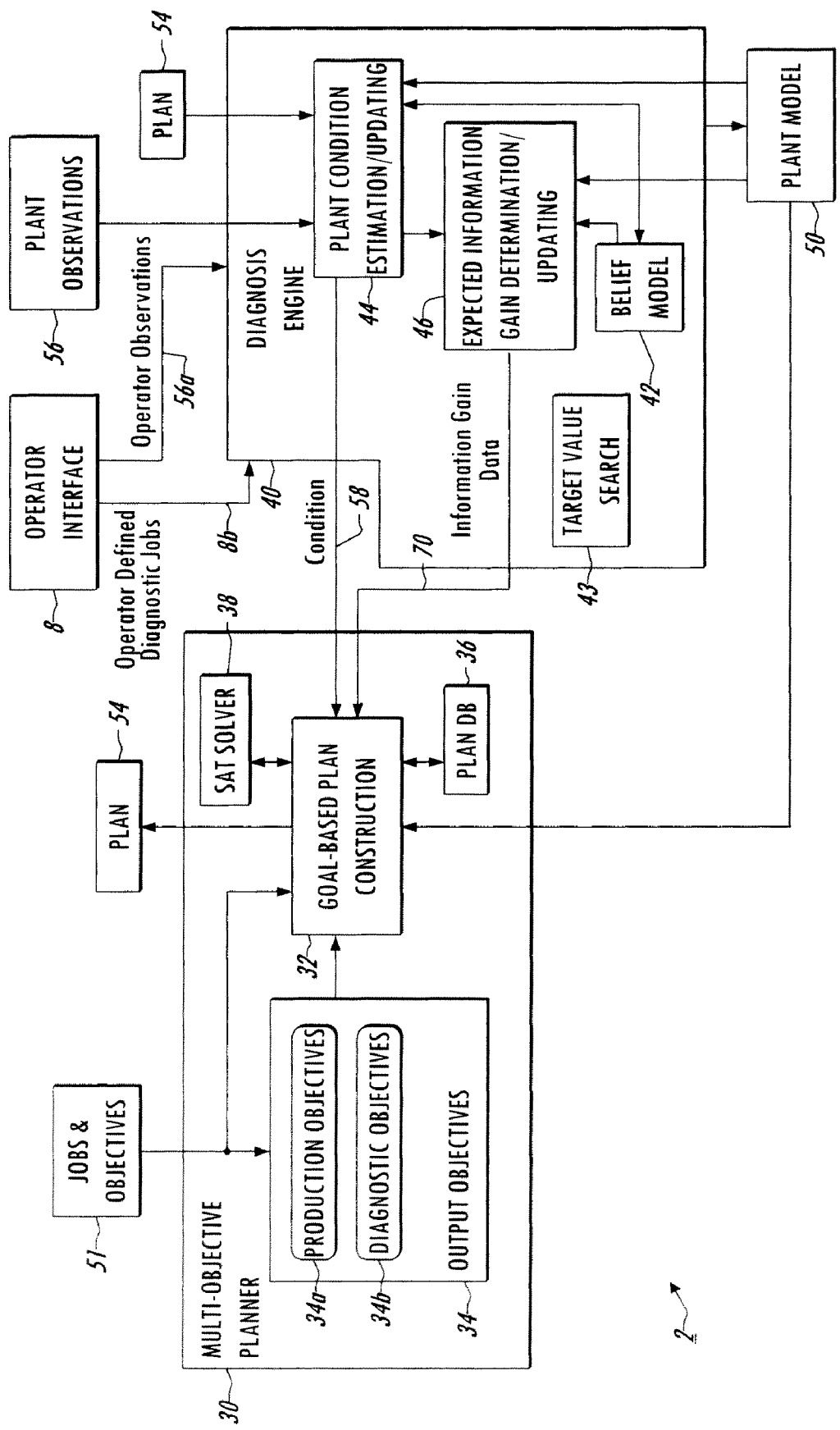
FIG. 13 is a schematic diagram illustrating further details of the exemplary planner and diagnosis engine in the control system of FIGS. 11 and 12.

The system 500 of FIG. 1 may constitute a component of a production control system 2 as shown in FIGS. 11-13 below, or the search component 43 may constitute or form a part of a part of a consumer search system 500, for instance, for presenting users with vacation plans or maps and driving directions to one or more user-defined destinations that have a user-entered duration and/or cost or ranges thereof. Unlike conventional shortest-path solutions, the techniques and systems described herein provide for efficient identification of the path that most closely matches a non-zero target value. An exemplary graph 502 is shown in FIG. 3 that includes a plurality of nodes representing states having at least one property value, as well as a plurality of edges between pairs of nodes, where each edge has at least one positive directional weight value.

As shown in FIG. 1, the exemplary system 500 includes a target value search component 43 having a graph construction component 43a, a computation component 43b, and a search component 43c in the illustrated embodiment. Referring also to FIG. 2, the system 500 is provided with the starting graph 502 (at 602 in FIG. 2) that includes a plurality of nodes 510, such as nodes s, a, b, and g in FIG. 3, which represent states having at least one property value. The property values may represent operational states of a machine or system, such as the production plant 20 in FIGS. 11-13 below, or may represent a physical (geographic) location in travel planning systems 500, or may represent any other type or form of state. Moreover, each node 510 may have more than one property value, for example, where a first node 510 may represent a given location at a first time and another node 510 may represent the same location at a second time.

The starting graph 502 also includes a plurality of edges 512 between pairs of nodes 510, where each edge has at least one positive directional weight value (FIG. 1). The weight value or values for a given edge 512 in the graph 502 are representative of properties that can be used to quantify a directional action or state transition in terms that may be associated with a target value. For example, the weight value may represent duration, such as the amount of time needed to transition from the originating node state 510 to the succeeding node state 510 along a given edge 512. In another example, the edge weight values may represent a cost, such as the cost of travelling from one location (at a first node 510) to another location (at a second node 510). In other examples, individual edges 512 in the graph 502 may have multiple positive weight values, such as duration and cost for transitioning from a first state node 510 to another state node 510. In still another example, the weight value(s) for a given edge 512 may represent a probability, such as a value from 0 to 1 inclusive that quantifies the probability of a production system failure in transitioning the system (e.g., plant 20 in FIGS. 11-13 below) from a first system state at a first graph node 510 to a subsequent system state at a second node 510.

The exemplary starting graph 502 in FIG. 3 includes several illustrated nodes 510 and edges 512, wherein this representation is simplified in order to avoid obscuring the novel features of the described systems and methods, wherein the graph 502 in practice may include a large number of nodes 510 and edges 512. In the example of FIG. 3, only six exemplary nodes 510 are shown, including an exemplary start node 510 labeled "s", an exemplary goal node 510 labeled "g", and two intervening nodes "a" and "b" with various edges 512 interconnecting these exemplary nodes 510, and with those edges 512 in the figure that do not form valid paths between these exemplary nodes 510 being shown with double cross lines indicating that these edges 512 terminate or originate at non-illustrated nodes 510. The edges 512, moreover, are directional in nature, and thus represent a node/state transition in a single direction only, with the weight values all being positive (e.g., non-negative, including zero). In the illustrated example, the edges 512 are shown in FIGS. 3-10 with arrow line ends indicating the directionality corresponding to the weight values.

In finding one or more paths that most closely approximate a given target value T (target 508 in FIG. 1), the target value search component 43 receives as inputs a start node "s" (e.g., at 604 in FIG. 2), as well as one or more goal nodes "s" (606 in FIG. 2), and one or more target values "T" (608 in FIG. 2). More than one goal node may be provided, for example, where a consumer is considering a trip to Europe and wants a selection of travel plans for a given time period that last from 5-7 days and cost in a given monetary range, and wants to consider travel to one of several destination cities/countries/regions (e.g., Barcelona or Berlin or Rome). Also, more than one target value may be provided, such as for specifying a range in terms of temporal duration or cost (e.g., for travel planning system applications) or for ranges of production plan generation failure probabilities, etc.

Figure 4:
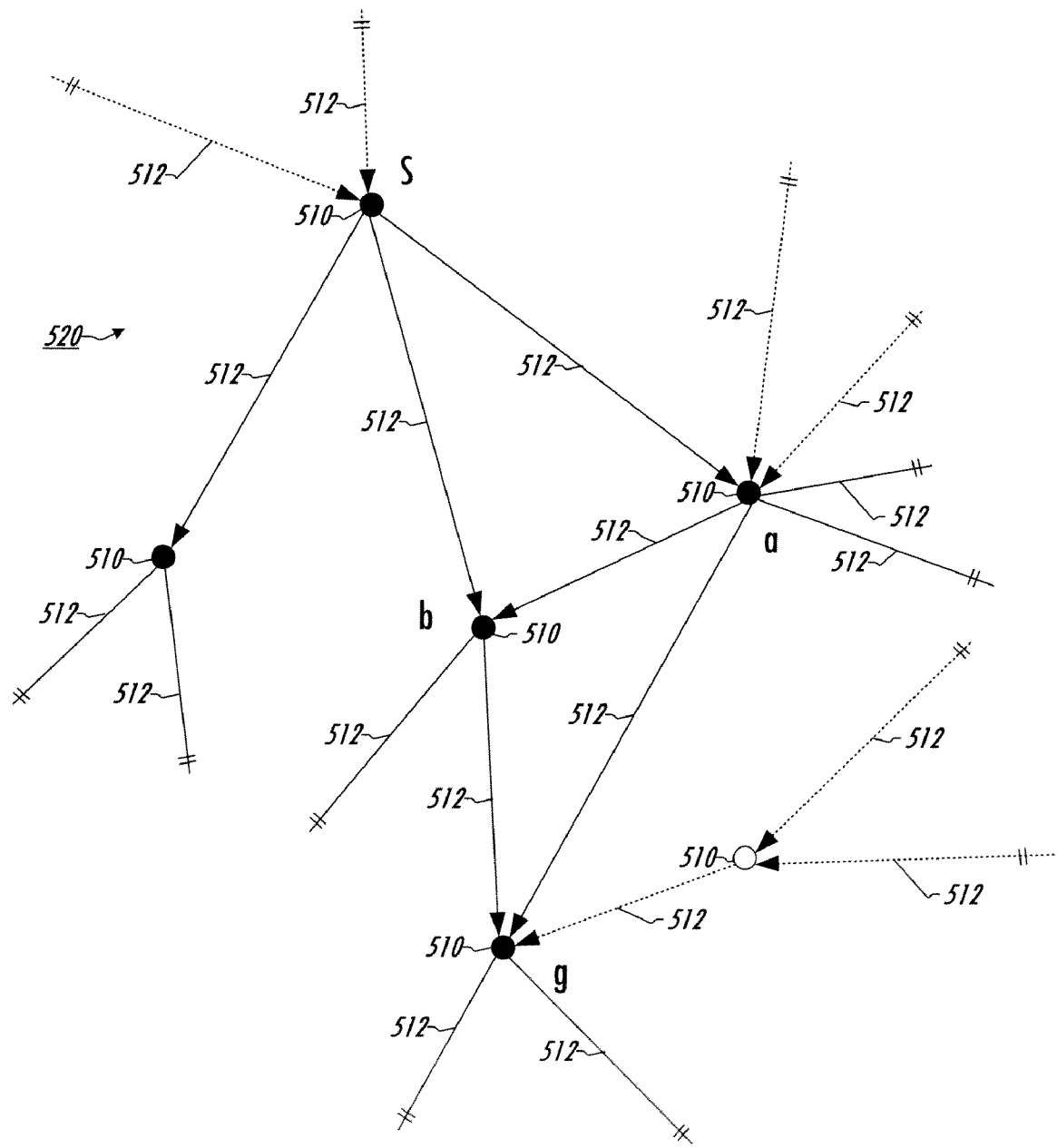
FIG. 4 is a schematic diagram illustrating an exemplary successor graph constructed based on the start node in the starting graph of FIG. 3.

The graph construction component 43a receives these inputs and uses these to construct a successor graph 520 (at 612 in FIG. 2) based at least partially on the starting graph 502 and the start node "s". FIG. 4 illustrates an example successor graph 520 constructed from the starting graph 502 of FIG. 3, and includes only those edges that can succeed ultimately from the specified start node "s" 510, where the other edges 512 in the figure are shown in phantom as these are not included in the successor graph 520. The graph construction component 43a may store the constructed successor graph 520 in any suitable form or format, such as a listing saved in memory of the system 500 with data indicating the nodes 510 and their properties as well as the edges 512 with their node associates and directions and weight values. Similar storage can be provided for the original starting graph 502 or the system 500 may operate on a separately stored starting graph 502.

At 614 in FIG. 2, the construction component 43a constructs a predecessor graph 522 (FIG. 5) based at least partially on the starting graph 502 and at least one goal node "g". In certain implementations, a separate predecessor graph 522 is created at 614 with respect to each specified goal node 510. The predecessor graph includes those nodes 510 and edges 512 that can ultimately end at the goal node "g", and the predecessor graph(s) 522 may be stored. At 616, the construction component 43a constructs one or more connection graphs 524 (FIGS. 6 and 7) based at least partially on the successor and predecessor graphs 520 and 522, respectively. In one example, a separate connection graph 524 is created for each corresponding predecessor graph 522, and thus for each corresponding goal node "g" specified by the input. Moreover, the construction component 43a may construct one or more connection graphs 524 by any suitable means, based at least partially on the starting graph 502, a start node "s" 510, and one or more goal node(s) 510 "g", which may be performed as a single process or step or may be done via a plurality of steps or processes. In the illustrated embodiment, the construction component 43a constructs the connection graph 524 as the intersection of the successor and predecessor graphs 520 and 522. FIG. 6 shows the connection graph 524 constructed as the intersection of the successor and predecessor graphs of FIGS. 4 and 5, and this connection graph 524 is shown in simplified form in FIG. 7 to better illustrate the start node s, goal node g, intervening nodes a and b, and edges e1-e5 with corresponding directional weight values, where the construction component 43a may store the connection graph 524 in any suitable manner for further processing by the search component 43c.

Figure 5:
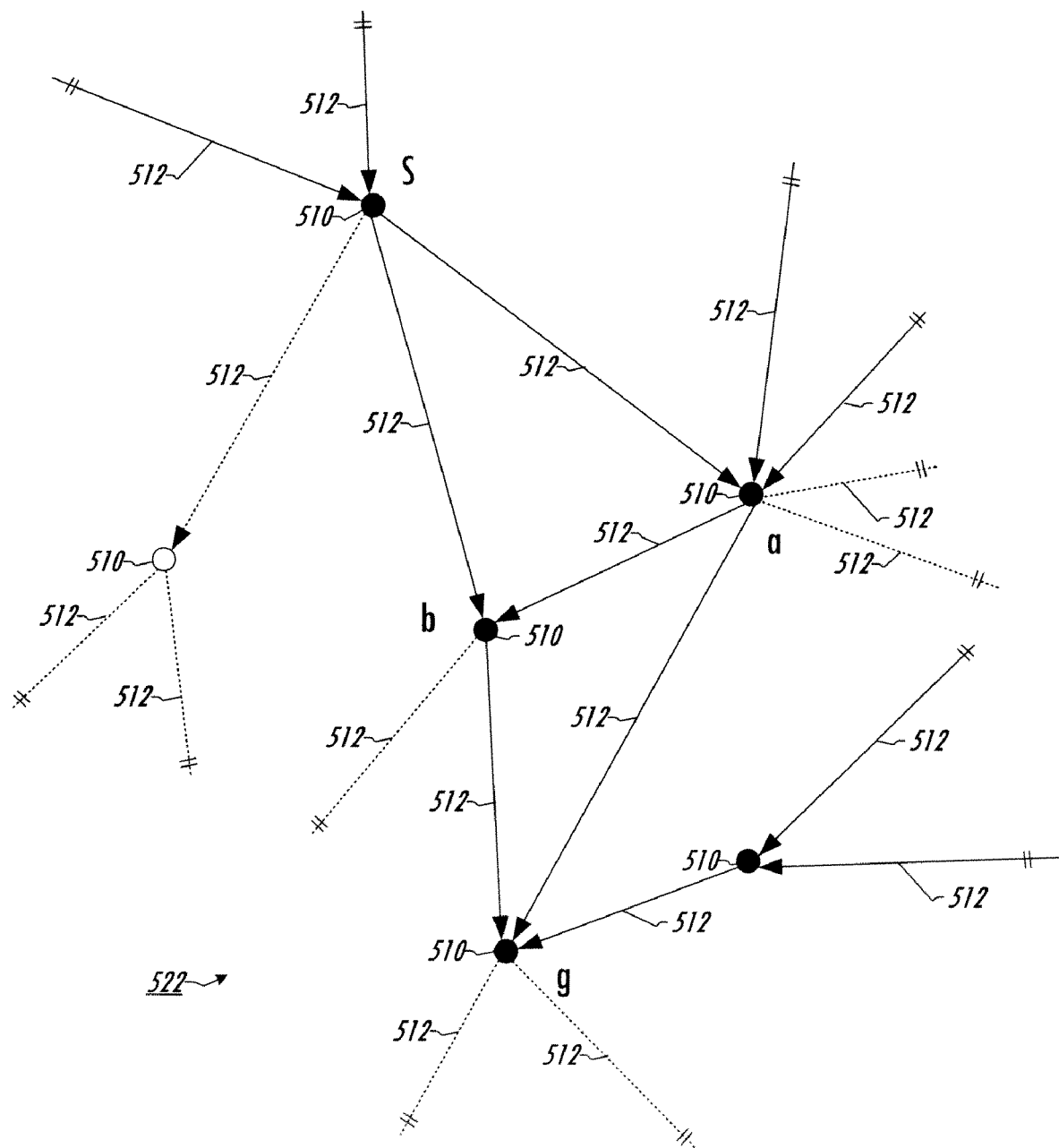
FIG. 5 is a schematic diagram illustrating an exemplary predecessor graph constructed based on the goal node in the starting and successor graphs of FIGS. 3 and 4.
Figure 6:
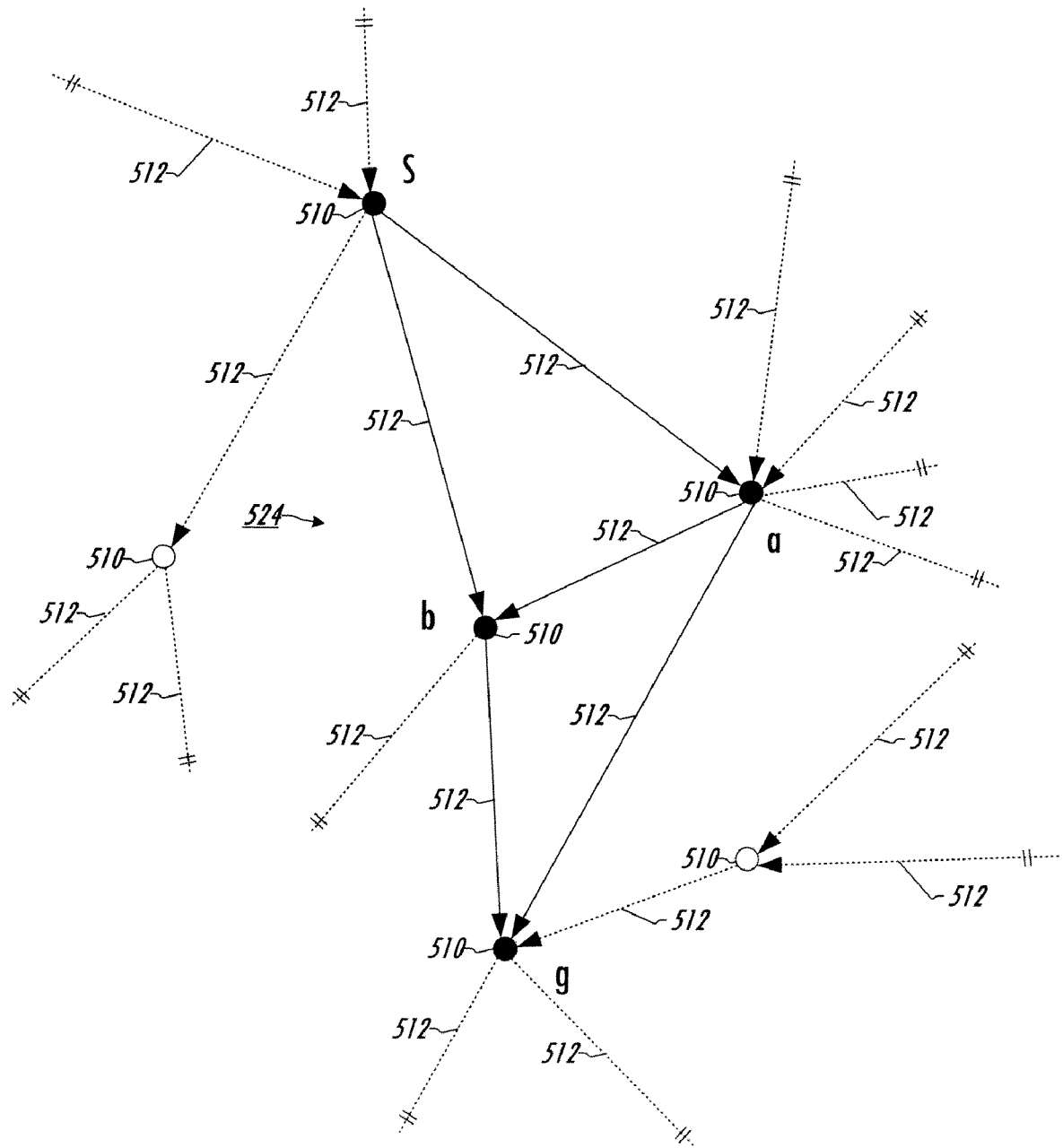
FIG. 6 is a schematic diagram illustrating an exemplary connection graph constructed as the intersection of the successor and predecessor graphs of FIGS. 4 and 5.
Figure 8:
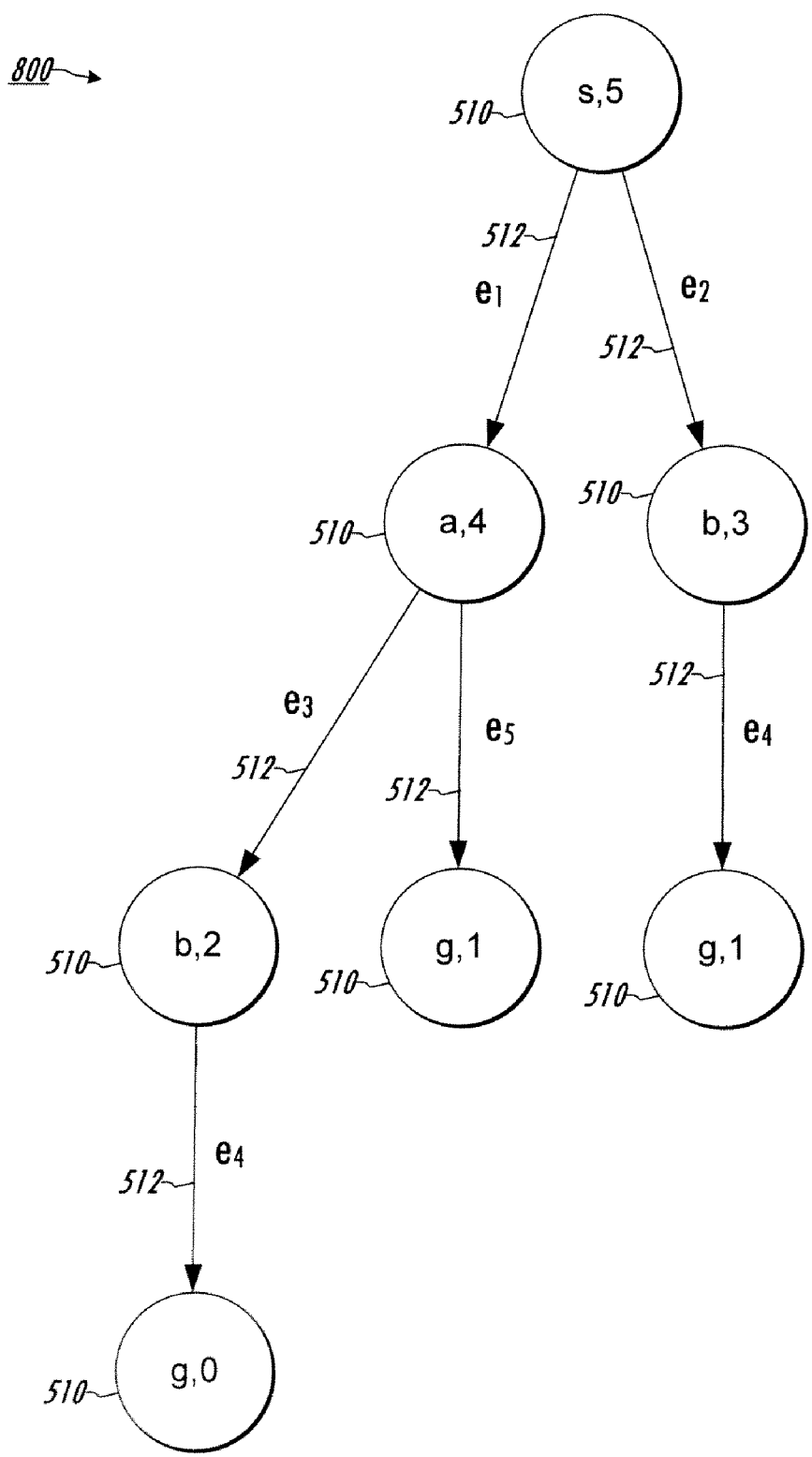
FIG. 8 is a schematic diagram illustrating an exemplary expansion tree constructed from the connection diagram of FIGS. 5 and 6 showing three possible paths from the start node to the goal node.

FIG. 8 is a schematic diagram illustrating an exemplary expansion tree constructed from the connection diagram of FIGS. 5 and 6 showing three possible paths from the start node "s" to the goal node "g" via one or more of the intervening nodes "a" and "b", with the start node 510 indicating a beginning target value T=5, and each successive node 510 in each branch indicating the remaining value after the weight value of the preceding edge 512 is subtracted.

Figure 9:
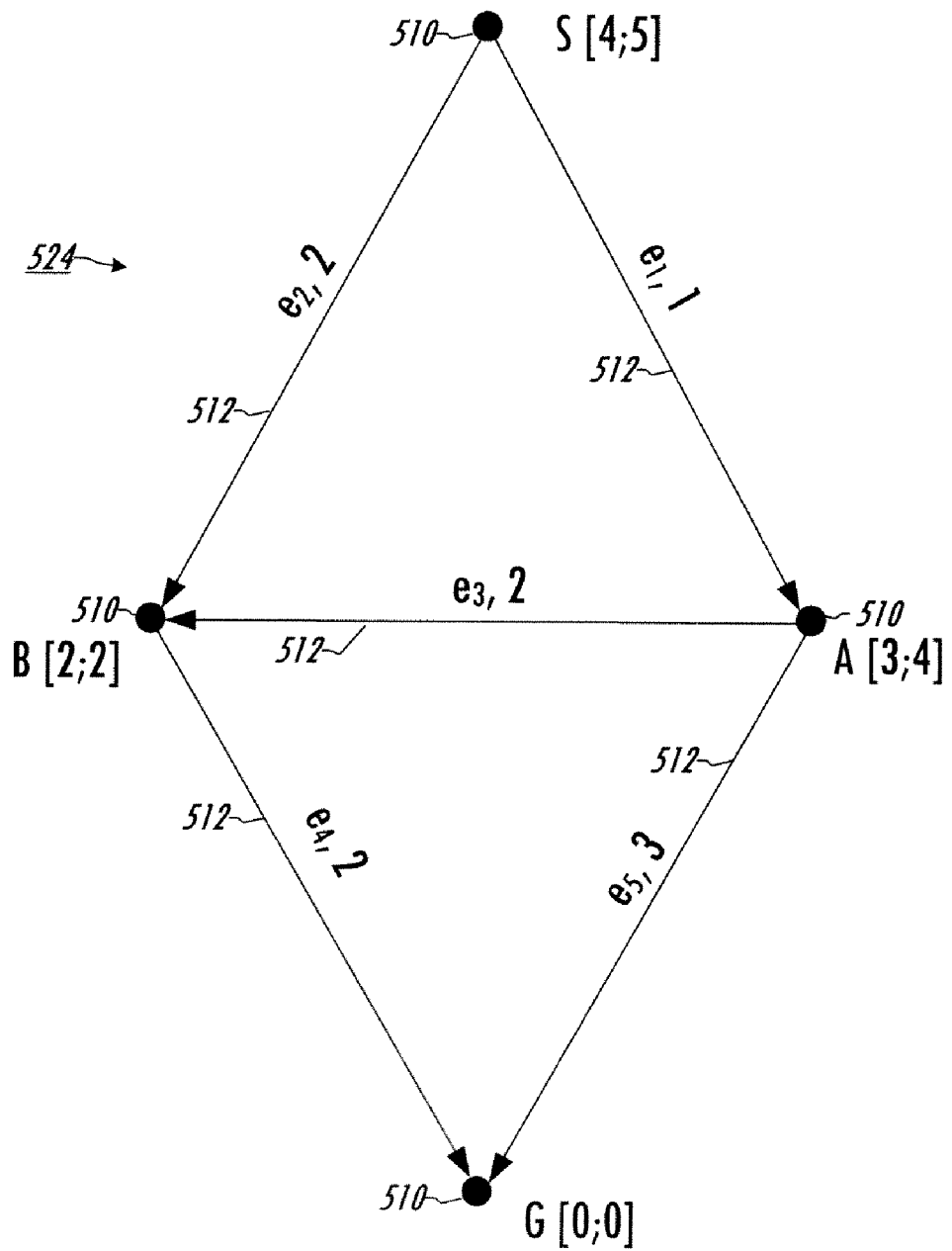
FIG. 9 is a schematic diagram illustrating the exemplary connection diagram of FIGS. 5 and 6 including upper and lower bound values for the nodes s, a, b, and g.
Figure 10:
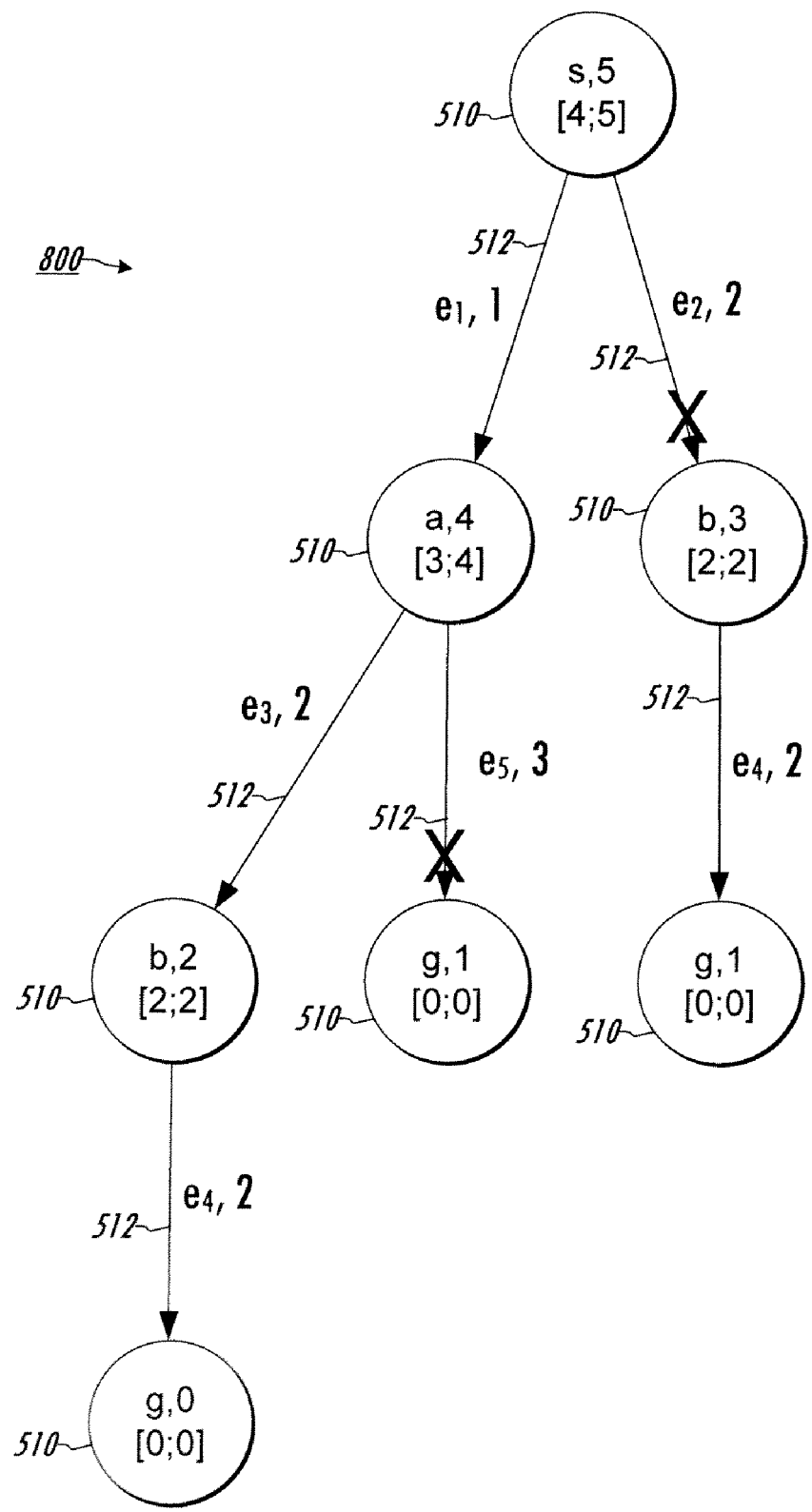
FIG. 10 is a schematic diagram illustrating the expansion tree of FIG. 8 with elimination of two paths and identification of an exemplary path closest to a non-zero target value via the systems and methods of the present disclosure.

Using the connection graph 524, the computation component 43b determines upper and lower bound values 527 (628 in FIG. 2) for each given node 510 of the connection graph 524 based at least partially on the weight values of all paths from that node to the goal node(s) "g". FIGS. 9 and 10 respectively illustrate the connection graph 524 and expansion tree 524 for this simplified example, including upper and lower bound values 527 [Lower Bound; Upper Bound] for the nodes s, a, b, and g, with FIG. 10 showing selective elimination of two paths and identification of an exemplary path s, a, b, g closest to a non-zero target value T=5 via the first search using the systems and methods of the present disclosure. The bound value determination at 618 in the illustrated embodiment of FIG. 1 involves the computation component 43b initializing the upper and lower bound values 527 of the goal node(s) "G" to zero (as shown in FIG. 9). Propagating backward from the goal node "g" to the start node "s", the computation component 43b determines an upper bound value 527 ($U_{Sm}$) and a lower bound value 527 ($L_{Sm}$) along incoming edges 512 to each given node n 510 in the connection graph 524 from the given node's predecessor nodes m 510 according to the following equations:

$$L_{S_m} = \min_{S_n \in SUC(S_m)} [v(a_{S_m, S_n}) + L_{S_n}]$$

$$U_{S_m} = \max_{S_n \in SUC(S_m)} [v(a_{S_m, S_n}) + U_{S_n}]$$

where $v(a_{SM,SN})$ is the directional weight value of the edge 512 from the predecessor node m to the given node n. Thus, at node "b" in FIG. 9, both bound values 527 are 2 as only the edge 512 $e_4$ (with a weight value of 2) is traversed to arrive at the goal node "g". Node "a", on the other hand, has two possible routes to the goal node "g". The first subpath via node "b" traverses edges $e_3$ (weight of 2) and edge $e_4$ (weight of 2) for a total of 4. The second subpath directly traverses edge $e_5$ with a weight of 3. Thus, for node "a", the lower bound value $L_{Sm}=3$ and the upper bound value $U_{Sm}=4$. Similar computations are performed propagating backward from the goal node "g" to the start node "s" for each node 510 in the connection graph 524 to compute the bound values 527 shown in FIG. 9.

Using the upper and lower bound values 527, the search component 43c performs a best first search (at 620 in FIG. 2) to identify at least one path 530 from the start node "s" to the goal node(s) "g" having a path value that is closest to the non-zero target value T 508 (or to a range specified by multiple target values T). In one exemplary embodiment, this includes performing a node evaluation at 620 for each given node n propagating forward from the start node "s" to the goal "g" according to the following node evaluation by generating a set of successor nodes (successor node sets 528 in FIG. 1) for each given node n, which may be stored in memory. For each successor node of a given set 528, the search component 43c determines the successor node value $T'_{PI \to S_n} = T - v(p_{I \to S_n})$, where $v(p_{I \to S_n})$ is the weight value of the edge 512 from the given node n to the given successor node 510. For each successor node of a given set 528, the search component 43c evaluates a function F using the upper and lower bound values 527 of the successor node 510 as follows:

$$F(p_{I \to S_n}) = \begin{cases} 0; & \text{overlap}(\Delta T'_{p_{I \to S_n}}, \Delta I_{S_n}) \\ \min\begin{pmatrix} |T'_{p_{I \to S_n}} - L(S_n)|, \\ |T'_{p_{I \to S_n}} - U(S_n)| \end{pmatrix}; & \text{otherwise} \end{cases}$$

where $\Delta T'_{PI \to S_n} = [T'_{PI \to S_n}, T'_{PI \to S_n}]$ and $\Delta I_{S_n} = [L(S_n), U(S_n)]$. The values of the function F may be stored in system memory. The search component 43c then selectively eliminates non minimal successor nodes 510 from the sets 528, retaining one or more nodes 510 for which the function F is zero or minimal, and removing all other successor nodes 510. The search component 43c then identifies the path(s) from the start node "s" to the goal node "g" having a value closest to a non-zero target value T based at least partially on the successor node sets 528. As described further below, the search component 43c may further include a pruning component 529 that selectively prunes the successor node sets 528 in order to speed up the best first search.

The described systems and techniques are useful in a variety of practical applications beyond those exemplified in the described embodiments to provide a solution for combinatorial search problems in which the objective is to find a set of one or more paths in a graph 502 with a value as close as possible to some non-zero target value. The above described techniques provide algorithms 526 that decompose the target value search problem into components where a heuristic search, such as A* searching can be employed. In the general situation, a starting graph G=(V, E) is provided, such as a weighted directed acyclic graph in which v(p) is the value of a path p from a starting node "s" to one or more goal nodes "g", where the graph nodes 510 may alternatively be referred to as vertices. Given a non-minimal/non-maximal target value "T", the described system 500 and method 600 identify the path or paths from the starting node s to the goal node(s) g that has a path value "v" closest to the target value T. The target value path problem is non-order preserving, in that the best path completion at a given node 510 depends on the previously traversed path from the start node s to the current node 510.

With the connection graph(s) 524, the problem may be solved by construction of an expansion tree as shown in FIGS. 8 and 10, in which each node 510 represents a plan prefix, and evaluating all the path values to identify the path with a value closest to the target T. However, this approach in most useful applications would be computationally impractical. In the illustrated embodiments, a best first search technique is employed using the upper and lower bound values 527 for all possible paths from a given node 510 to the goal node "g".

Assuming G=($\mathbb{V}_G, \mathbb{E}_G$) is a finite, acyclic, directed graph 502, $\mathbb{V}_G$ where is a set of directional vertices 512 and $\mathbb{E}_G \subseteq \mathbb{V}_G \times \mathbb{V}_G$ is a set of edges 512 with positive edge weights. A path is defined as a sequence $p=\langle s_0, \ldots, s_n \rangle$ from node $s_0$ to $s_n$ in G iff $\forall s_i \in p: s_i \in \mathbb{V}_G \wedge \forall i \in [1:n]:(s_{i-1}, s_i) \in \mathbb{E}_G$. The length of a path $\|p\|$ is the number of elements in its sequence minus one, i.e., the number of node transitions. The start and goal nodes s and $g \in \mathbb{V}_G$ are nodes 510 in the graph 502 and $\mathbb{P}_{s \to g}$ is the set of all paths from s to g in G. Defining relations predecessor $\prec_G \subseteq \mathbb{V}_G \times \mathbb{V}_G$ and successor $\succ_G \subseteq \mathbb{V}_G \times \mathbb{V}_G$ as relations on vertices of a graph, such that $a \prec_G b \Leftrightarrow \exists p \in \mathbb{P}_G: p = \langle a, \ldots, b \rangle$ and $a \succ_G b \Leftrightarrow \exists p \in \mathbb{P}_G: p = \langle b, \ldots, a \rangle$, their respective complements are $\not\prec_G = (\mathbb{V}_G \times \mathbb{V}_G) \setminus \prec_G$ and $\not\succ_G = (\mathbb{V}_G \times \mathbb{V}_G) \setminus \succ_G$, $v: \mathbb{E}_G \to \mathbb{R}^+$ is a function mapping each edge to a positive real value, referred to as the value function. In the following discussion, v(p) is defined for some paths in G as the sum of the values of edges 512 in p and call v(p) the value of a path.

For some target value $T \in \mathbb{R}$, a path $p \in \mathbb{P}_{s \to g}$ exists, called a target value path, whose value v(p) is closest to the target value T with respect to s, g, and T and denote the set of these paths as $\mathbb{P}_{s \to g}^T$, given as:

$$\mathbb{P}_{s \to g}^T = \underset{p \in \mathbb{P}_{s \to g}}{\arg\min} |v(p) - T|. \quad (A)$$

A non-deterministic version of the exemplary target value search returns some target value path $p_{s \to g}^T \in \mathbb{P}_{s \to g}^T$. Extension to a deterministic version is straightforward and will be sketched out where it differs from the following considerations. In particular:

$$p_{s \to g}^T \in \underset{p \in \mathbb{P}_{s \to g}}{\arg\min} |v(p) - T|. \quad (B)$$

This search thus finds the paths that minimize the difference between the path value and the target value T. The target value path set can be computed with respect to the inputs s, g, and T by iteratively or recursively constructing the $\mathbb{P}_{s \to g}$ set and evaluating equation (1) above. Since the graph G 502 is finite, the set $\mathbb{P}_{s \to g}$ will also be finite $\forall s, g \in \mathbb{V}_G$, and each path $p \in \mathbb{P}_{s \to g}$ will be of finite length, so the set can always be constructed and thus equation (A) can be evaluated.

Note that argmin is a function $2^S \times (S \to \mathbb{R}) \to 2^S$. Letting $\delta: \mathbb{P} \times \mathbb{R} \to \mathbb{R}$ be a function defined as the difference between the value of some path to some value $\delta(p,t) = v(p) - t$, the set of target value paths can be recursively defined as:

$$\mathbb{P}_{s \to g}^T = \begin{cases} \{\langle g \rangle\} & \text{if } s = g \\ \emptyset & \text{if } g \not\succ_G s \wedge s \neq g \\ s \bigcirc \underset{p' \in \bigcup_{(s,s') \in E_G} \mathbb{P}_{s' \to g}^{T^{s'}}}{\arg\min} |\delta(p', T^{s'})| & \text{otherwise,} \end{cases} \quad (C)$$

where $T^{s'} = T - v(\langle s, s' \rangle)$ target value minus the value of the path $\langle s, s' \rangle$. The mapping $\bigcirc: \mathbb{V} \times 2^\mathbb{P} \to 2^\mathbb{P}$ is defined for (vertex, set of paths) pairs, such that there are edges 512 between vertex and the first element of each path in the set defined in G. This mapping operates to map those pairs to the set comprising the concatenations of s and each path, resulting in a path in G. Equation (C) shows the recursive definition of $\mathbb{P}_{s \to g}^T$. The set of target value paths, is either the singleton $\{\langle g \rangle\}$ iff s=g, the empty set $\emptyset$ iff $g \not\succ_G s$ (this case ensures, that $\mathbb{P}_{s \to g}^T$ is defined for all pairs of vertices s, $g \in \mathbb{V}G$), or the set of paths resulting from concatenating to s the "best" (with respect to the respective target values $T^{s'}$ of the successors) set of completions in the graph G. It is noted that for paths $p = \langle s_0, s_1, \ldots, s_n \rangle$, $p' = \langle s_1, \ldots, s_n \rangle$, and for the values $t, t' = t - v(\langle s_0, s_1 \rangle)$, $\delta(p, t) = \delta(p', t')$. Accordingly, in the third case, the optimal completions can always be found in the union of target value path sets of the immediate successors s', g and their respective target value $T - v(\langle s, s' \rangle)$. Hence, the definition is tree recursive in the first argument of argmin.

Moreover, this recursion is guaranteed to terminate. It follows, that $\mathbb{P}_{s \to g}^T$ can be calculated in straightforward fashion through the above decomposition. However, due to the tree recursive nature of this algorithm, the computation can be quite expensive, especially on graphs 502 with high fan-out. For example, graphs 502 having roughly 40 nodes with an average fan-out of 3 result in a recursion tree of about 20000 nodes. However, there is a way to significantly reduce the costs for computing the target value path set.

Assuming an extract of the graph 502 $G = (\mathbb{V}_G, \mathbb{E}_G)$ as shown in FIG. 3, the successor graph 520 $S_v^G$ of a vertex $v \in G$ (FIG. 4) is defined as the subgraph 520 comprising of all successors of v in G and all edges 512 between these successors in G:

$$\begin{aligned} S_v^G &= (\mathbb{V}_{S_v^G}, \mathbb{E}_{S_v^G}) \\ &= (\{v \in \mathbb{V}_G \mid v \succ_G s\}, \\ &\quad \{(v_1, v_2) \mid v_1, v_2 \in \mathbb{V}_{S_v^G} \wedge (v_1, v_2) \in \mathbb{E}_G\}). \end{aligned} \quad (D)$$

The predecessor graph 522 $P_v^G$ of a vertex $v \in G$ (FIG. 5) is the subgraph comprising of all predecessor nodes 510 of v in G and all edges 512 between these predecessors in G:

$$\begin{aligned} P_v^G &= (\mathbb{V}_{P_v^G}, \mathbb{E}_{P_v^G}) \\ &= (\{v \in \mathbb{V}_G \mid v \prec_G s\}, \\ &\quad \{(v_1, v_2) \mid v_1, v_2 \in \mathbb{V}_{P_v^G} \wedge (v_1, v_2) \in \mathbb{E}_G\}). \end{aligned} \quad (E)$$

The connection graph 524 $C_{v_1 \to v_2}^G$ of verticies $v_1, v_2 \in G$ (FIG. 6) is the intersection of the successor graph 520 of $v_1$ in G and the predecessor graph 522 of $v_2$ in G:

$$\begin{aligned} C_{v_1 \to v_2}^G &= (\mathbb{V}_{C_{v_1 \to v_2}^G}, \mathbb{E}_{C_{v_1 \to v_2}^G}) \\ &= (\mathbb{V}_{S_{v_1}^G} \cap \mathbb{V}_{P_{v_2}^G}, \mathbb{E}_{S_{v_1}^G} \cap \mathbb{E}_{P_{v_2}^G}). \end{aligned} \quad (F)$$

The above decomposition algorithm can be thought of as expanding the connection graph $C_{s \to g}^G$ into a directed tree, beginning with (s, T) as its root node, iteratively generating for each node (n, t) a child for each successor n' of n in $C_{s \to g}^G$, with the node labeled (n', t−v((n, n')). Due to the structure of $C_{s \to g}^G$, this expansion ends with a tree where all leaves are labeled with g and some value ti, due to g being (by construction) the only node without successors in $C_{s \to g}^G$. These leaf nodes each represent one of the possible paths between s and g with their respective ti denoting their absolute difference to the target value, or formally the absolute value of the |δ|- function of the path in regards to T. Consequently, the paths from the root node of the expansion tree to the leaves with minimal |t| comprise the desired target value path set $\mathbb{P}_{s \to g}^T$. An example pseudo code listing below gives the tvs algorithm:

---
Algorithm 1: tvs(G,s,g,T)
---
```
begin
    C = conGraph(G,s,g);
    Tree = (s,T);
    expand(Tree.root,C);
    return T.bestSolutions( );
end
```
---

Figure 7:
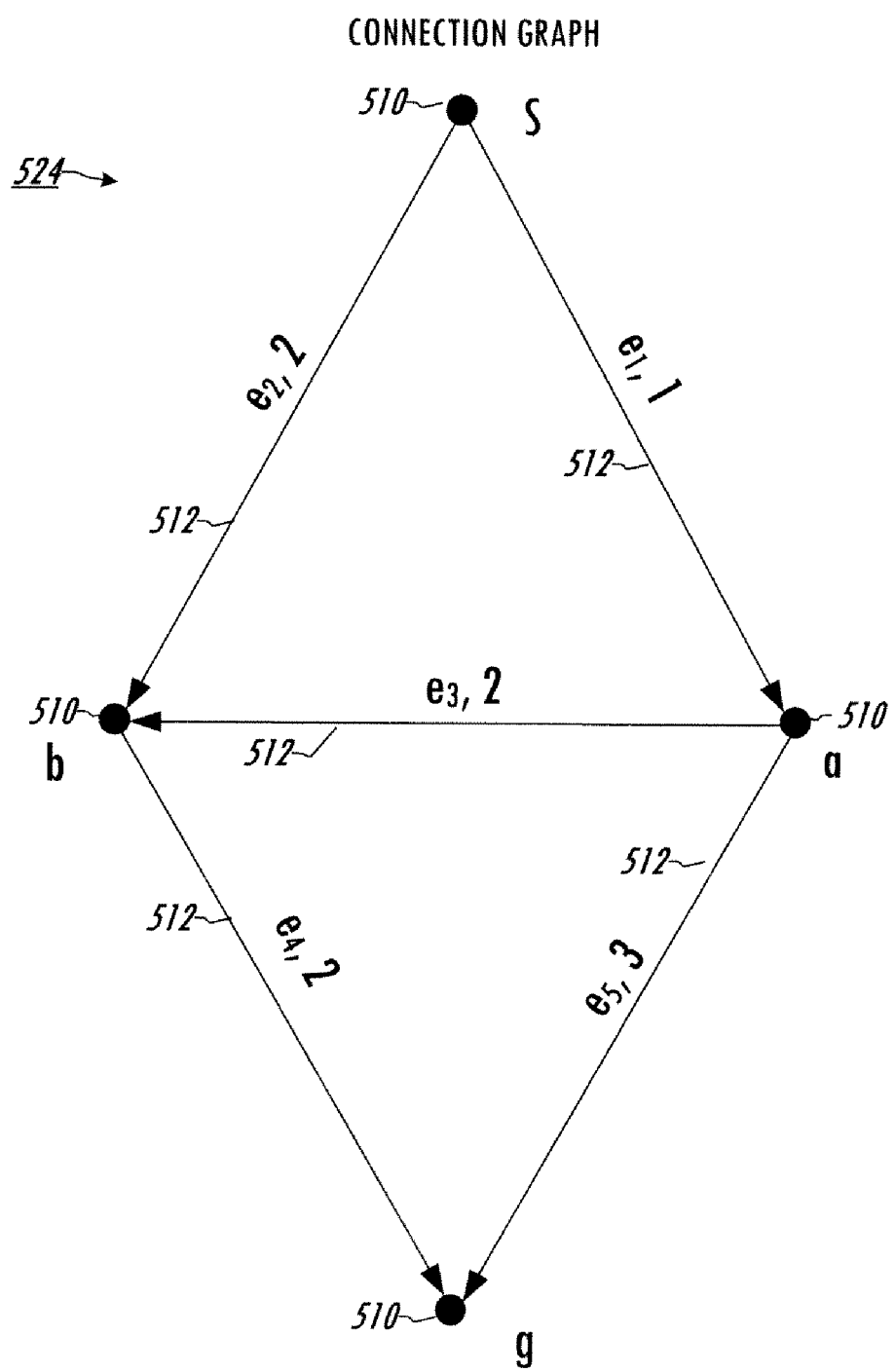
FIG. 7 is another schematic diagram illustrating the exemplary connection diagram of FIG. 6 in simplified form, showing start node s, goal node g, intervening nodes a and b, and edges $e_1$-$e_5$ with corresponding directional weight values.

FIGS. 7 and 8 above depict the exemplary connection graph 524 (FIG. 7) with edge weights and its corresponding expansion tree (FIG. 8) for a target value of 5, where the target value paths set is $\mathbb{P}_{s \to g}^T = \{\langle s, a, b, g \rangle\}$.

---
Algorithm 2: expand((n,t),C)
---
```
begin
    foreach n'; C.succOf(n) do
        t' = t-v(n,n');
        (n,t).addChild(n', t');
        expand(n',t');
end
```
---

Letting 1: $\forall C_{s \to g}^G \to \mathbb{R}_0^+$ and $\forall C_{s \to g}^G \to \mathbb{R}_0^+$ be functions where $\forall n \in \forall C_{s \to g}^G : l(n) \leq \min_{p \in \mathbb{P}_{n \to g}} v(p) \wedge u(n) \geq \max_{p \in \mathbb{P}_{n \to g}} v(p)$ some lower bound, the nodes' T values during generation of the above tree represent the target values for their respective suffix paths. If for a given node (n, t), $t \leq l(n)$ holds, the best completion for this node is the shortest path in $\mathbb{P}_{n \to g}$, as any other completion will result in a larger offset from the target value T. In the analogous case of $t \geq u(n)$ the best completion is the longest path in $\mathbb{P}_{n \to g}$. As a result, if either of these conditions hold for a node 510, graph expansion for that node 510 can be stopped and its completion can be calculated by a shortest (longest) path search in $L_{n \to g}$. In both cases this can be done efficiently using the A* algorithm with heuristics l and u, respectively. It is further noted that as $L_{n \to g}$ is a subgraph of G, it will also be cycle free, and thus the longest path search can be done with a modified A*.

Consequently, the exemplary heuristic target value search algorithm 526 operates in two phases. The first phase is graph expansion, where successors for nodes (n, t) are generated unless either the leaf level is reached (i.e. n=g), or t falls out of the [l(n),u(n)] interval. These nodes are stored in a candidate list for later processing. At the end of this phase, the algorithm determines the leaf node with the minimum t value. The algorithm 526 should terminate as soon as no better path can be found, so in case some generated leaf node is optimal (i.e. its t value is zero), the algorithm 526 terminates and returns the corresponding path.

Otherwise, the algorithm 526 advances to phase two, where it marks the best solution found in phase 1 (or ∞, if the leaf level was not reached) and searches the candidate list for pairs (n, $t_1$), (n, $t_2$), such that both $t_1$ and $t_2$ are lower (resp. greater) than l(n) (resp. u(n)). In such cases the node with the larger (resp. lower) t is pruned, as the corresponding path will always be worse. Finally it initializes, for each node (n, t) in the retained set, a shortest (respectively longest) path A* search from n to g in their particular graph $C_{n \to g}^G$, with initial cost set to the corresponding ti. Note that these searches are done in the much smaller graph space, as opposed to the tree expansion in prefix space. The $C_{n \to g}^G$ DAGs are cycle free, so A* longest path searches are straightforward. Now, in each step the algorithm first checks the termination condition: is the current best solution's t value lower or equal then the intermediate t values of all the first elements in the open queues? The intermediate t value is the F function value of the A* search plus the t value of the original candidate node. If this condition is satisfied, there can be no better path and the algorithm returns the current best solution. Otherwise the search with the lowest intermediate t value is advanced (one node expanded). Should the selected A* terminate, its solution is compared to the current best solution, which it eventually displaces. If all A* searches terminate, the current best solution is returned. Note that this heuristic target value search is nondeterministic, i.e. it only calculates a single representative of $\mathbb{P}_{n \to g}^T$. However, extension to a deterministic version is straightforward. The following pseudo code is provided for this heuristic target search algorithm:

---
Algorithm 3: htvs(G,s,g,T,l,u)
---
```
begin
                                            /* Phase I */
    C = conGraph(G,s,g);
    Tree = (s,T):
                                            /* Main I */
    expandH(Tree.root,C. Candidates);
    if Tree.hasSolution( ) then
        Best = Tree.bestSolutions( ).some( );
    else
        Best = (< >.infinity);
                                            /* Phase II */
    Candidates.pruneDuplicates( );
    foreach (n,t): Candidates do
        if t <= l(n) then
            A*[ ].add(new Amin*(n,g), new Offset(t));
        else
            A*[ ].add(new Amax*(n,g), new Offset(t));
                                            /* Main II */
    while A*[ ].hasCandidate( ) do
        if Best.t <= A*[ ].getBestIntermediateT( ) then
            return Best;
        A*[ ].advanceBestIntermediateT( ):
        if A*[ ].searchFinished( ) &&
           A*[ ].lastFinishedSearch( ).t < Best.t then
            Best = A*[ ].lastFinishedSearch( );
    return Best;
end
```
---

```
Algorithm 4: expand((n,t),Candidates,C,l,u)
begin
    if t<= l(n) || t>= u(n) && (C.hasSucc(n)) then
        Candidates.add((n,t));
    else
        foreach n' := C.succOf(n) do
            t' = t-v(n,n');
            (n,t).addChild(n',t');
            expandH(n',t');
end
```

In the A* search, heuristics may be generated manually or automatically. One suitable technique employs dynamic programming to compute actual path completion costs, and complete dynamic programming could be used to solve the problem. A sparse form of dynamic programming, however, provides accurate lower and upper bounds for each vertex. The graph structure and edge values can be used to compute a search heuristic or algorithm 526 so as to calculate value bounds for each vertex n of the graph for the path leading to the goal vertex g that goes through n. The heuristic may be constructed by exploring the graph similar to a breadth-first search (BFS). Starting from the goal vertex g and propagating backwards, the computation component 43b examines all the immediate predecessor vertices by computing the bound interval for their path value to g. Then for each of those immediate predecessor vertices, the computation component 43b examines their immediate predecessor vertices recursively, and so on, until the entire connection graph 524 has been evaluated back to the start node s.

The data structures used to compute these bound values 527 may be implemented as a queue of vertices and a map map(n)=(l(n),u(n)), where the keys are vertices and the values are intervals. For each vertex n the associated interval, (l(n), u(n)) represents the best value bounds for paths from n to g with a lower bound l(n) and an upper bound u(n). The bounds of the interval associated with g are initialized to zero because the value of a zero length path is zero. All other bound values 527 are initialized to positive infinity for the lower bound and zero for the upper bound. The construction of the heuristic begins by putting the goal vertex g in the queue, and continues by popping the queue stack and examining the first vertex from the queue until the queue is empty. The examination of a vertex n includes two operations: (1) add all the immediate predecessors of vertex n to the end of the queue, and (2) update their bounds. The bounds update for a predecessor vertex m is defined as follows:

$$l(m) = \min(v(m, n) + l(n), l(m))$$

$$u(m) = \begin{cases} \max(v(m, n) + u(n), u(m)) & \text{if } u(m) < T + l(m) \\ \infty & \text{otherwise} \end{cases}$$

If the queue is empty, the bounds for every vertex of the graph have reached a fixed point. The computed map (e.g., values 527 in FIG. 1) includes the lower and upper bounds 527 for the path value, and the map is then used to guide the search.

The node evaluation of the search includes evaluation of the function F as previously discussed:

$$T'_{p_{I \to S_n}} = T - v(p_{I \to S_n})$$

$$\Delta T'_{p_{I \to S_n}} = [T'_{p_{I \to S_n}}, T'_{p_{I \to S_n}}]$$

$$\Delta I_{S_n} = [L(S_n), U(S_n)]$$

$$F(p_{I \to S_n}) = \begin{cases} 0: & \text{overlap}(\Delta T'_{p_{I \to S_n}}, \Delta I_{S_n}) \\ \min \begin{pmatrix} |T'_{p_{I \to S_n}} - L(S_n)|, \\ |T'_{p_{I \to S_n}} - U(S_n)| \end{pmatrix} & \text{otherwise} \end{cases}$$

In the original graph 502, the goal node is initialized to [0;0], and propagate bounds along incoming edges to a node. This can be efficiently done with dynamic programming.

$$L_{S_m} = \min_{S_n \in SUC(S_m)} [v(a_{S_m, S_n}) + L_{S_n}]$$

$$U_{S_m} = \max_{S_n \in SUC(S_m)} [v(a_{S_m, S_n}) + U_{S_n}]$$

The illustrated embodiments may also provide selective pruning of the search space via component 529 in FIG. 1:

Given $p_{I \to S_n}, \Delta I(p_{I \to S_1}) = [L_{\Delta I(PI \to S_n)}, U_{\Delta I(PI \to S_n)}]$ $V_{\Delta I(PI \to S_n)} = \min(|L_{\Delta I(PI \to S_n)} - 0.5|, |U_{\Delta I(PI \to S_n)} - 0.5|)$ Given: $p_{I \to S_1}, V_{\Delta I(PI \to S_1)}$ and $p_{I \to S_2}, V_{\Delta I(PI \to S_2)}$ If $V_{\Delta I(PI \to S_1)} > V_{\Delta I(PI \to S_2)} \wedge \neg (L_{\Delta I(PI \to S_1)} \leq 0.5 \leq U_{\Delta I(PI \to S_1)})$ then prune $p_{I \to S_n}^1$ If $V_{\Delta I(PI \to S_1)} < V_{\Delta I(PI \to S_2)} \wedge \neg (L_{\Delta I(PI \to S_2)} \leq 0.5 \leq U_{\Delta I(PI \to S_2)})$ then prune $p_{I \to S_n}^2$ Referring also to FIGS. 11-17, the starting graph 512 can be a belief model 42 of a diagnosis engine 40 (FIGS. 11-13) in a model-based control system 2 for constructing plans 54 for operating a production plant 20 to achieve one or more production goals. In this application, the starting graph 512 includes a plurality of nodes 510 representing a state of the production plant 20 and a plurality of edges 512 that represent actions by one or more plant resources 21-24 to transition the plant state from one graph node 510 to another, each edge 512 having at least one positive directional weight value defining a failure probability associated with the action having a value between 0 and 1 inclusive. In this case, the target value search component 43 is incorporated into the diagnosis engine 40 and the search component 43c thereof performs a best first search to identify at least one production plan 54 to achieve a given production goal that has a failure probability value closest to a non-zero target value. In the following example, moreover, the target value is advantageously set to 0.5 or some range therearound in order to identify plans having optimal learning potential for diagnosing faults in the plan resources 21-24.

In the exemplary planner-driven system of FIGS. 11-13, the model of the system describes all the major components or resources 21-24 in the plant 20, the connections between the components, and all the actions a component can take. The task of the planner 30 is to find the sequence of actions, called a plan, which will move sheets through the system 20 to generate the requested output. FIGS. 11-13 illustrate on such system 1 in which the various aspects of the present disclosure may be implemented.

As best shown in FIG. 11, a production system 6 is illustrated including a producer component 10 that receives production jobs 49 from a customer 4 and a plant 20 having a plurality of resources 21-24 that may be actuated or operated according to one or more plans 54 so as to produce one or more products 52 for provision to the customer 4 by the producer 10, where 'producing' products can include modifying products, objects, etc., including without limitation packaging or wrapping products. FIG. 12 illustrates further details of one exemplary plant 20 and FIG. 13 shows additional details regarding the exemplary model-based control system 2. The producer 10 manages one or more plants 20 which actually produce the output products 52 to satisfy customer jobs 49. The producer 10 in this embodiment provides jobs and objectives 51 to a multi-objective planner 30 of the model-based control system 2 and the production system 6 receives plans 54 from the planner 30 for execution in the plant 20. The jobs 54 can include one or both of production and diagnostic goals. As shown in FIG. 11, the control system 2 further includes a plant model 50 with a model of the plant 20, and a diagnosis engine 40 with a belief model 42 and a target value search component 43 as described above. The diagnosis engine 40 determines and updates a current plant condition 58 via a plant condition estimation/updating component 44 (FIG. 13) based on one or more previously executed plans 54, corresponding observations 56 from the plant 20, and the model 50. The diagnosis engine 40 also provides expected information gain data 70 to the planner 30 for one or more possible plans 54 based on the current plant condition 58 and the model 50.

The model-based control system 2, including the target value search component 43 and other components thereof may be implemented as hardware, software, firmware, programmable logic, or combinations thereof, and may be implemented in unitary or distributed fashion. In one possible implementation, the planner 30, the diagnosis engine 40, search component 43, and the model 50 are software components and may be implemented as a set of sub-components or objects including computer executable instructions and computer readable data executing on one or more hardware platforms such as one or more computers including one or more processors, data stores, memory, etc. The components 30, 40, 43, and 50 and sub components thereof may be executed on the same computer or in distributed fashion in two or more processing components that are operatively coupled with one another to provide the functionality and operation described herein. Likewise, the producer 10 may be implemented in any suitable hardware, software, firmware, logic, or combinations thereof, in a single system component or in distributed fashion in multiple interoperable components. In this regard, the control system 2 may be implemented using modular software components (e.g., model 50, planner 30, diagnosis engine 40 and/or sub-components thereof) to facilitate ease of debugging and testing, the ability to plug state of the art modules into any role, and distribution of operation over multiple servers, computers, hardware components, etc.

The embodiment of FIG. 11 also includes an optional operator interface 8 implemented in the computer or other platform(s) on which the other components of the control system 2 are implemented, although not a strict requirement of the disclosure, wherein the operator interface 8 may alternatively be a separate system operatively coupled with the control system 2. The exemplary operator interface 8 is operatively coupled with the diagnosis engine 40 to provide operator observations 56*a* to the diagnosis engine 40, with the diagnosis engine 40 determining the current plant condition 58 based at least partially on the operator observations 56*a* in certain implementations. Moreover, the exemplary operator interface 8 allows the operator to define a diagnostic job 8*b* using a diagnosis job description language 8*a*, and the diagnosis engine 40 may provide diagnostic jobs 60 to the producer 10. The diagnosis engine 40 in this implementation is operative to selectively provide one or more self-generated diagnostic jobs 60 and/or operator defined diagnostic jobs 8*b* to the producer 10, which in turn provides jobs and objectives 51 to the planner 30.

Referring also to FIGS. 12 and 13, the planner 30 provides one or more plans 54 to the production system 6 for execution in the plant 20 based on at least one output objective 34 (FIG. 13) and production goals as directed by the incoming jobs 51 from the producer 10. As shown in FIG. 13, the planner 30 selectively factors in one or more output objectives 34 derived from the jobs and objectives 51 in constructing plans 54 including production objectives 34*a* and diagnostic objectives 34*b*. In one possible implementation, the production objectives 34*a* are created and updated according to the jobs and objectives 51 obtained from the production system 6, and the diagnostic objectives 34*b* are derived from and updated according to the current plant condition 58 and the expected information gain data 70 provided by the diagnosis engine 40. The production objectives 34*a* in one implementation may relate to the scheduling of orders for produced products 52 (FIG. 11), and may include prioritization of production, minimization of inventory, and other considerations and constraints driven in large part by cost and customer needs. Examples of production objectives 34*a* include prioritizing plan construction/generation with respect to achieving a given product output goal (simple production criteria) as well as a secondary consideration such as simple time efficient production, cost efficient production, and robust production. For instance, cost efficient production objectives 34*a* will lead to construction/generation of plans 54 that are the most cost efficient among the plans that met the production goal as dictated by the jobs 51 received from the producer 10. The diagnostic objectives 34*b* may include objectives related to determining preferred action sequences in generated plans 54 for performing a given production-related task, minimization of maintenance and repair costs in operation of the plant 20, identifying resources 21-24 causing intermittent or persistent faults, etc.

As further shown in FIG. 13, the control system 2 may optionally include a plan data store or database 36 used to store plans 54 selectable by the planner 30 for execution in the plant 20 to facilitate one or more production or diagnostic objectives 34, wherein construction/generation of a plan 54 as used herein can include selection of one or more pre-stored plans 54 from the data store 36. In this regard, the planner 30 can selectively re-order a job queue so as to improve the likelihood of information gain. Although illustrated as integral to the planner 30, the plan data store 36 may be provided in a separate component or components that are operatively coupled with the planner 30 by which the planner 30 can obtain one or more plans 54 (whole and/or partial) therefrom. Alternatively or in combination, the planner 30 can synthesize (e.g. construct or generate) one or more plans 54 as needed, using the plant model 50 and information from the producer 10 and diagnosis engine 40 to determine the states and actions required to facilitate a given production and/or diagnostic objectives 34.

The planner 30 creates and provides plans 54 for execution in the plant 20. The plans 54 include a series of actions to facilitate one or more production and/or diagnostic objectives 34 while achieving a production goal according to the jobs 51, and in which a given action may appear more than once. The actions are taken with respect to states and resources 21-24 defined in the model 50 of the plant 20, for example, to route a given substrate through a modular printing system 20 from a starting state to a finished state as shown in FIG. 12. In operation, the planner 30 generates or constructs a plan 54 that will achieve a given production goal at least partially based on a diagnostic objective 34b and the expected information gain data 70 from the diagnosis engine 40. The planner 30 in the illustrated embodiment includes a goal-based plan construction component 32 that assesses the current plant condition 58 from the diagnosis engine 40 in generating a plan 54 for execution in the plant 20. The component 32 may also facilitate identification of faulty components 21-24 or sets thereof in constructing the plans 54 based on observations 56 and current plant conditions 58 indicating one or more plant components 21-24 as being suspected of causing system faults.

Figure 14:
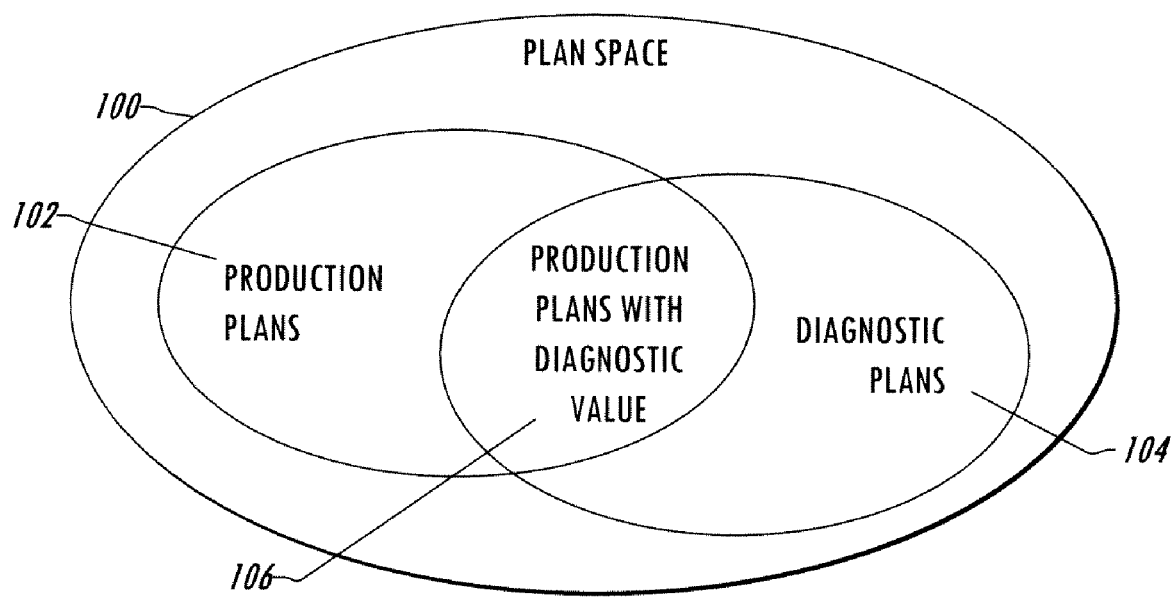
FIG. 14 is a schematic diagram illustrating a plan space for a production system, including production and diagnostic plans.

Referring also to FIG. 14, the system generates plans 54 for execution in the plant 20 within a plan space 100 that includes both production plans 102 and diagnostic plans 104. As seen in the diagram of FIG. 14, the union of the plan sets 102 and 104 includes production plans 106 that have diagnostic value (e.g., can facilitate one or more diagnostic objectives 34b in FIG. 3), wherein the planner 30 advantageously utilizes information from the diagnosis engine 40 to preferentially construct plans 106 that achieve production goals while obtaining useful diagnostic information in accordance with the diagnostic objectives 34b. The intelligent plan construction aspects of the present disclosure thus integrate the production planning and diagnosis to facilitate the acquisition of more useful diagnostic information compared with conventional passive diagnostic techniques without the down-time costs associated with conventional dedicated diagnostics. The diagnostic information gained, in turn, can be used to improve the long term productivity of the system 6, thereby also facilitating one or more production objectives 34a (FIG. 13).

As further illustrated in FIG. 13, the diagnosis engine 40 includes a belief model 42 representing the current state of the plant 20, and a component 44 that provides the current condition of the plant 20 to the planner 30 based on the previous plan(s) 54 and corresponding plant observations 56. The component 44 also estimates and updates the plant condition of the belief model 42 according to the plant observations 56, the plant model 50, and the previously executed plans 54. The operator observations 56a from the interface 8 may also be used to supplement the estimation and updating of the current plant condition by the component 44. The estimation/updating component 44 provides the condition information 58 to inform the planner 30 of the confirmed or suspected condition of one or more resources 21-24 or other components of the plant 20 (FIG. 11). This condition information 58 may be considered by the plan construction component 32, together with information about the plant 20 from the plant model 50 in providing plans 54 for implementing a given production job or goal 51, in consideration of production objectives 34a and diagnostic objectives 34b. The diagnosis engine 40 also includes a component 46 that provides expected information gain data 70 to the planner 30 based on the model 50 and the belief model 42. The information gain data 70 may optionally be determined in consideration of the operator defined diagnostic jobs 8b from the operator interface 8.

In accordance with the present disclosure, the starting graph 502 of FIG. 1 constitutes or is included within the belief model 42 of the diagnosis engine 30 and a plurality of nodes 510 representing a state of the production plant 20 and a plurality of edges 512 representing actions by one or more of the plant resources 21-24 to transition the plant state from one graph node 510 to another. Each edge 512 in this embodiment includes at least one positive directional weight value defining a failure probability associated with the action having a value between 0 and 1 inclusive. The target value search component 43 of the diagnosis engine 30 operates as described above to perform a best first search to identify at least one production plan 54 to achieve a given production goal that has a failure probability value closest to a non-zero target value T, which in one implementation is preferably 0.5 to optimize the expected information gain with regard to diagnostic goals in operation of the system.

FIG. 12 illustrates further details of an exemplary modular printing system plant 20 in the production system 6, including material supply component 21 that provides printable sheet substrates from one of two supply sources 21a and 21b, a plurality of print or marking engines 22, an output finisher station 23, a modular substrate transport system including a plurality of bidirectional substrate transport/router components 24 (depicted in dashed circles in FIG. 12), one or more output sensors 26 disposed between the transport system 24 and the finisher 23, and a controller 28 providing control signals for operating the various actuator resources 21-24 of the plant 20. The exemplary printing system plant 20 includes four print engines 22a, 22b, 22c, and 22d, although any number of such marking engines may be included, and further provides a multi-path transport highway with three bidirectional substrate transport paths 25a, 25b, and 25c, with the transport components 24 being operable by suitable routing signals from the controller 28 to transport individual substrate sheets from the supply 21 through one or more of the marking engines 22 (with or without inversion for duplex two-side printing), and ultimately to the output finishing station 23 where given print jobs are provided as output products 52. Each of the printing engines 22, moreover, may individually provide for local duplex routing and media inversion, and may be single color or multi-color printing engines operable via signals from the controller 28. The model-based control system 2 may, in certain embodiments, be integrated into the plant controller 28, although not a strict requirement of the present disclosure.

Referring now to FIGS. 11-13, in operation, the planner 30 automatically generates plans 54, for example, by piece-wise determination of a series of actions to form a plan and/or by obtaining whole or partial plans 54 from the data store 36 for component resources 21-24 of the printing system plant 20 from a description of output production goals derived from the incoming jobs 51 in consideration of one or more production objectives 34a and diagnostic objectives 34b. In particular, when the plant 20 has flexibility in how the output goals can be achieved (e.g. in how the desired products 52 can be created, modified, packaged, wrapped, etc.), such as when two or more possible plans 54 can be used to produce the desired products 52, the diagnosis engine 40 can alter or influence the plan construction operation of the planner 30 to generate a plan 54 that is expected to yield the most informative observations 56. The constructed plan 54 in this respect may or may not result in a plan that compromises short term production objectives 34a (e.g., increases job time or slightly lowers quality), but production nevertheless need not be halted in order for the system to learn. The additional information gained from execution of the constructed job 54 can be used by the producer 10 and/or by the planner 30 and diagnosis engine 40 to work around faulty component resources 21-24, to schedule effective repair/maintenance, and/or to further diagnose the system state (e.g., to confirm or rule out certain system resources 21-24 as the source of faults previously detected by the sensor(s) 26). In this manner, the information gleaned from the constructed plans 54 (e.g., plant observations 56) can be used by the estimation and updating component 44 to further refine the accuracy of the current belief model 42.

Moreover, where the plant 20 includes only limited sensing capabilities, (e.g., such as the system in FIG. 12 having only sensors 26 at the output of the transport system 24 downstream of the printing engines 22), passive diagnosis are unable to unambiguously identify every possible fault in the system 20, whereas direct diagnostic efforts lead to system down-time and the associated cost in terms of productivity. The control system 2 of the present disclosure, on the other hand, advantageously facilitates selective employment of intelligent on-line diagnosis though construction and execution of plans 54 that provide enhanced diagnostic information according to the plant condition 58 and/or the expected information gain 70, and may further advantageously facilitate generation of one or more dedicated diagnostic plans 54 for execution in the plant 20 based on at least one diagnostic objective 34b and the plant condition 58, and for intelligent interleaving of dedicated diagnostic plans 54 and production plans 54 based on production and diagnostic objectives 34 according to the current plant condition 58. In particular, the planner 30 can cause execution of explicit diagnostic plans 54 that involve halting production when the information gained from the plan 70 is expected to lead to significant future gains in productivity, enhanced ability to identify faulty resources 21-24, or other long term productivity objectives 34a and/or diagnostic objectives 34b.

Even without utilizing dedicated diagnostic plans 54, moreover, the control system 6 significantly expands the range of diagnosis that can be done online through pervasive diagnostic aspects of this disclosure during production (e.g., above and beyond the purely passive diagnostic capabilities of the system), thereby lowering the overall cost of diagnostic information by mitigating down time, the number of service visits, and the cost of unnecessarily replacing components 21-24 in the system 20 that are actually working, without requiring complete sensor coverage. The planner 30 is further operative to use the current plant condition 58 in making a tradeoff between production objectives 34a and diagnostic objectives 34b in generating plans 54 for execution in the plant 20, and may also take the condition 58 into account in performing diagnosis in isolating faulty resources 21-24 in the plant 20.

The plant condition estimation and updating component 44 of the diagnosis engine 40 infers the condition of internal components 21-24 of the plant 20 at least partially from information in the form or observations 56 derived from the limited sensors 26, wherein the diagnosis engine 40 constructs the plant condition 58 in one embodiment to indicate both the condition (e.g., normal, worn, broken) and the current operational state (e.g., on, off, occupied, empty, etc.) of the individual resources 21-24 or components of the plant 20, and the belief model 42 can be updated accordingly to indicate confidence in the conditions and/or states of the resources or components 21-24. In operation of the illustrated embodiment, once the producer 10 has initiated production of one or more plans 54, the diagnosis engine 40 receives a copy of the executed plan(s) 54 and corresponding observations 56 (along with any operator-entered observations 56a). The condition estimation and updating component 44 uses the observations 56, 56a together with the plant model 50 to infer or estimate the condition 58 of internal components/resources 21-24 and updates the belief model 42 accordingly. The inferred plant condition information 58 is used by the planner 30 to directly improve the productivity of the system 20, such as by selectively constructing plans 54 that avoid using one or more resources/components 21-24 known (or believed with high probability) to be faulty, and/or the producer 10 may utilize the condition information 58 in scheduling jobs 51 to accomplish such avoidance of faulty resources 21-24. The exemplary diagnosis engine 40 also provides future prognostic information to update the diagnostic objectives 34b which may be used by the planner 30 to spread utilization load over multiple redundant components 21-24 to create even wear or to facilitate other long term objectives 34.

To improve future productivity, moreover, the diagnosis engine 40 provides the data 70 to the planner 30 regarding the expected information gain of various possible production plans 54. The planner 30, in turn, can use this data 70 to construct production plans 54 that are maximally diagnostic (e.g., most likely to yield information of highest diagnostic value). In this manner, the planner 30 can implement active diagnostics or active monitoring by using carefully generated or modified production plans 54 to increase information during production (e.g., using 'diagnostic' production plans). Moreover, certain diagnostic plans 54 are non-productive with respect to the plant 20, but nevertheless may yield important diagnostic information (e.g., operating the transport mechanisms 24 in FIG. 12 such that all the substrate transport paths 25a, 25b, and 25c go in the backward direction away from the output finisher 23). Within this space of plans 54 that do not accomplish any production goals, the operator interface 8 allows an operator to create diagnostic jobs 8b via the job description language 8a, and the diagnosis engine 40 may also include a diagnosis job description language to generate dedicated/explicit diagnostic jobs 60 which are provided to the producer 10. The producer 10 may then provide these jobs 60 to the planner 30 along with the other jobs and objectives 51 to explicitly request the planner 30 to advance diagnostic objectives 34b. The producer 10 in one implementation may operate a job queue that queues requested customer and diagnostic jobs 49, 60 and the producer 10 receives component condition updates 58 from the diagnosis engine 40. The producer 10 uses the condition 58 to choose between customer jobs 49 and diagnosis jobs 60, to tradeoff production efficiency versus diagnostic value in production plans 54, and to merge (e.g., interleave) customer jobs 49 and dedicated diagnostic jobs 60 when they are compatible and wherein the scheduling thereof can facilitate one or more diagnostic and production objectives 34. The diagnosis engine 40 can also provide prognostic information to the planner 30 to help improve the quality of the plans 54 with respect to certain criteria. For example, the planner 30 (e.g., and/or the producer 10) is operative to selectively use fault state information to construct from multiple suitable production plans 54 based on the prognosis of plan alternatives for "robust printing" to distribute workload evenly across different resources 21-24 in order to reduce the frequency of scheduled or unscheduled maintenance of the plant 20.

Figure 15:
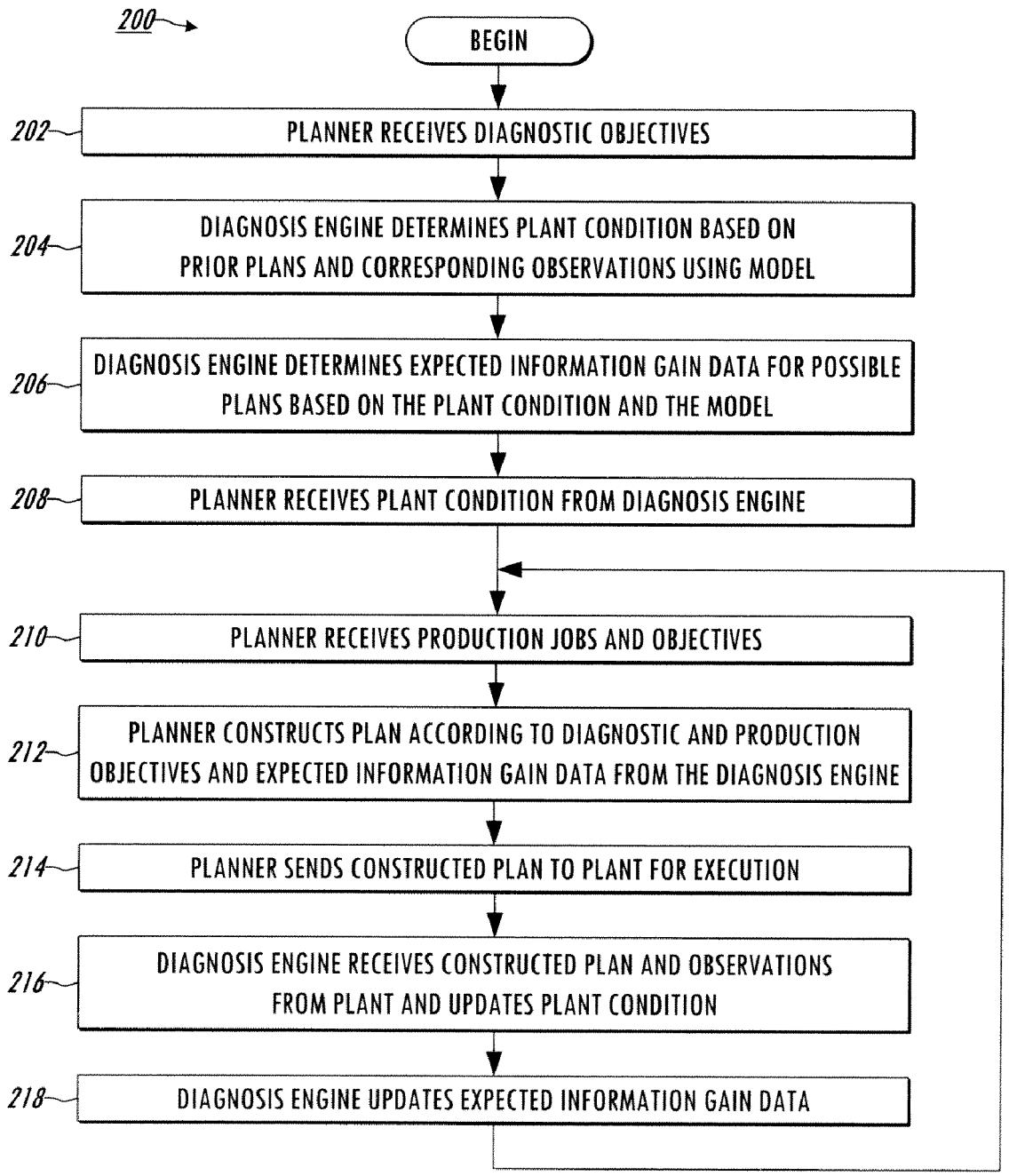
FIG. 15 is a flow diagram illustrating an exemplary method for constructing plans for execution in a production system in accordance with one or more aspects of the present disclosure.

Referring also to FIG. 15, an exemplary method 200 is illustrated for constructing plans 54 for execution in the production system 6 with a plant 20 having a plurality of resources 21-24 to achieve one or more production goals. Diagnostic objectives 34b are received at 202 in the method 200, and a current plant condition 58 is determined at 204 based at least partially on a previously executed plan 54 and at least one corresponding observation 56 from the plant 20 using a plant model 50. Expected information gain data 70 is determined at 206 based on the current plant condition 58 and the model 50. The planner 30 receives the plant conditions 58 at 208 from the diagnosis engine 40, and receives production jobs and objectives 51 at 210 from the producer 10. At 212, the planner 30 constructs a plan 54 at based at least partially on a diagnostic objective 34b and the expected information gain data 70. At 214, the planner 30 sends the constructed plan 54 to the plant 20 for execution and the diagnosis engine 40 receives the plan 54 and the plant observations 56 at 216. At 218, the diagnosis engine 40 updates the plant condition 58 and updates the expected information gain data 70, after which further jobs and objectives 51 are serviced and the process 200 continues again at 210 as described above.

The plan construction at 212 may be based at least partially on the current plant condition 58, and may include making a tradeoff between production objectives 34a and diagnostic objectives 34b based at least partially on the current plant condition 58. Moreover, the plan construction at 212 may include performing prognosis to isolate faulty resources 21-24 in the plant 20 based at least partially on the current plant condition 58. In certain embodiments, a dedicated diagnostic plan 54 may be constructed for execution in the plant 20 based at least partially on at least one diagnostic objective 34b, a diagnostic job 60, 8b, and the current plant condition 58, and the plan construction may provide for selectively interleaving dedicated diagnostic and production plans 54 based on at least one production objective 34a and at least one diagnostic objective 34b. Further embodiments of the method 200 may also include allowing an operator to define a diagnostic plan 8b using a diagnosis job description language 8a and receiving operator observations 56a, with the plan selection/generation at 216 being based at least partially on the operator observations 56a.

Figure 16:
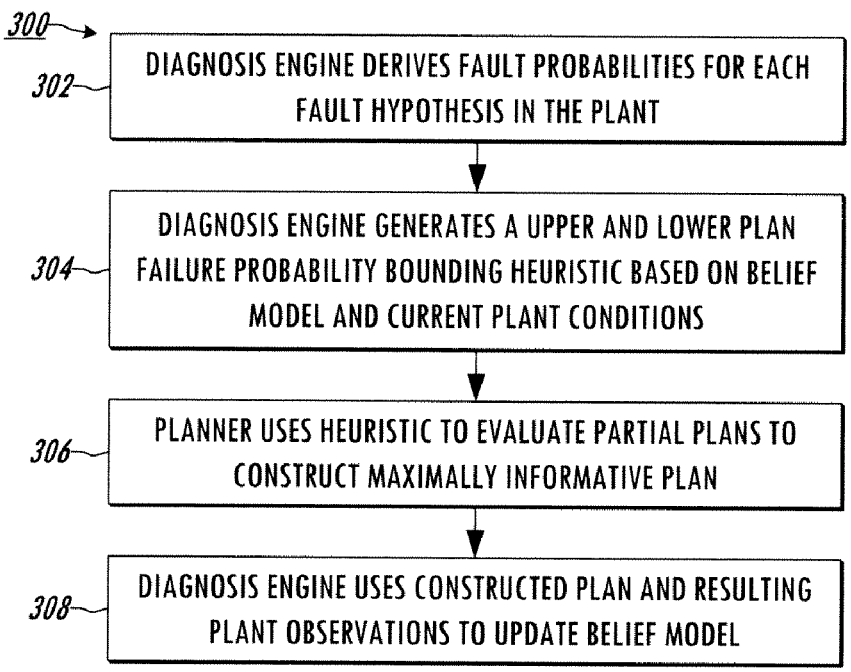
FIG. 16 is a flow diagram illustrating an exemplary method of evaluating and generating plans for execution in the plant using an A* search.
Figure 17:
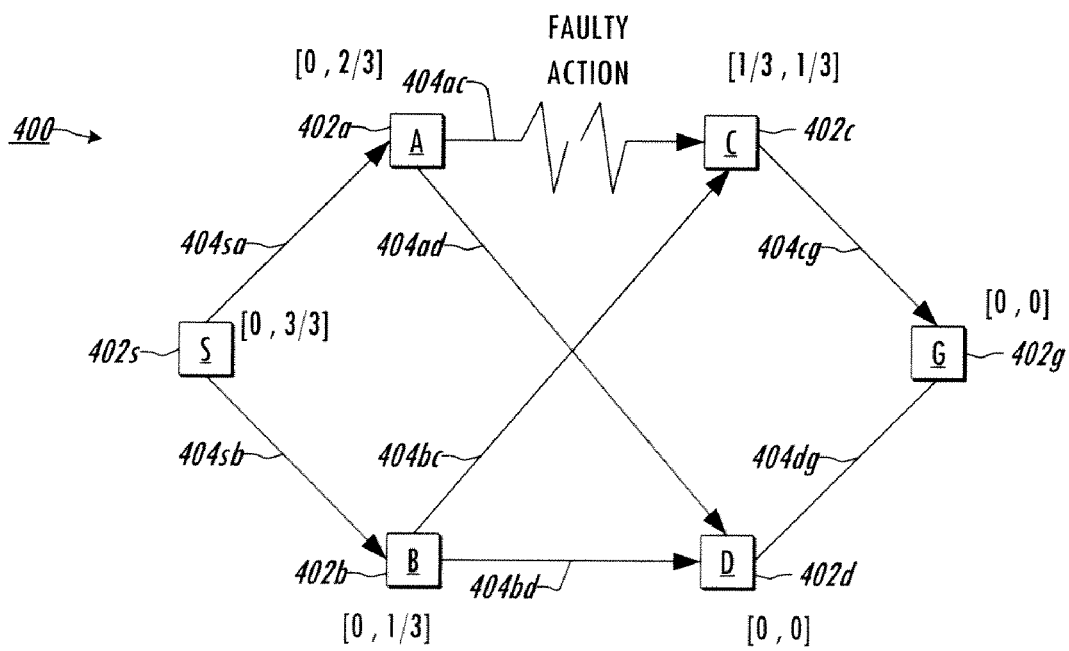
FIG. 17 is a schematic diagram illustrating an exemplary state/action diagram showing possible plans for transitioning the system state from a starting state to a goal state.

Referring now to FIGS. 16 and 17, a variety of techniques can be employed by the planner 30 in the above described control system 6 in constructing plans 54 to enhance diagnostic information gain while achieving production goals. In one embodiment, a heuristic search is employed by the planner 30 in constructing diagnostic production plans 54. FIG. 16 illustrates an exemplary method 300 for evaluating and constructing plans for execution in the plant 20 using A* search. In this embodiment, the component 44 of the diagnosis engine 40 (FIG. 13) establishes and updates beliefs in the belief model 42 about the plant conditions and updates the plant model 50. At 302 in FIG. 16, the component 44 derives failure or fault probabilities for each fault hypothesis in the plant 20 and employs dynamic programming at 304 to generate a upper and lower plan failure probability bounding heuristic based on the belief model 42 and the current plant condition 58. At 306, the planner 30 uses the heuristic to evaluate partial plans 54 so as to construct maximally informative plans 54, preferably using an A* search approach. At 308, the diagnosis engine 40 then uses the constructed plan 54 and output observations 56 obtained from execution of the constructed plan 54 in the plant 20 to update the belief model 42.

The diagnosis engine 40 in this approach advantageously provides the inputs for searching by the planner 30 in order to derive valuable information for the diagnosis of the system 20. In this embodiment, the best plans 54 with respect to diagnostic value for single persistent faults are those that have an equal probability of succeeding or failing. The diagnosis engine 40 uses this notion to develop heuristics to guide the search by the planner 30 in evaluating partial plans 54 to construct the plan 54 to be executed in the plant 20. In addition, the plan construction search may employ pruning techniques to improve search performance. By this approach, the control system 2 implements efficient on-line active or pervasive diagnosis in controlling the plant 20 through a combination of model-based probabilistic inference in the diagnosis engine 40 with decomposition of the information gain associated with executing a given plan 54 using an efficient heuristic target search in the planner 30. In this active diagnosis technique, specific inputs or control actions in the form of plans 54 are constructed by the planner 30 with the help of the diagnosis engine 40 to maximize or increase the amount and/or quality of diagnostic information obtained from the controlled system plant 20. The informative production (active or pervasive diagnosis) techniques of the present disclosure rank the set of partial plans at any given point in the construction process that achieve production goals by their potential information gain and the planner 30 operates to selectively generate the most promising strategy in that respect, in consideration of other possible production objectives 34a and diagnosis objectives 34b.

As discussed above in the context of the exemplary modular printing system plant 20 of FIG. 12, the planner 30 operates to construct the sequence of actions (plan 54) that transfers substrate sheets through the system 20 to generate a requested output for a given print job (e.g. to satisfy a production goal), using pervasive diagnosis to aid in plan construction. One particular production objective 34a in this system 20 is to continue printing even if some of the print engines 22 fail or some of the paper handling modules 24 fail or jam. In this exemplary modular printing system example 20, moreover, there are only output type sensors 26 preceding the finisher 23, and as a result, a plan 54 consisting of numerous actions must be executed before a useful observation 56 can be made. The diagnostic engine 40 updates its belief model 42 and the current condition 58 to be consistent with the executed plan 54 and the observations 56. The diagnosis engine 40 forwards updated condition information 58 and the expected information gain data 70 to the planner 30.

In the exemplary planner 30, a search algorithm may be employed to find and construct plans 54. The model 50 describes the plant system 20 as a state machine with all possible actions A that the plant 20 can accommodate. Actions are defined by preconditions and post-conditions over the system state. As such, an action requires the system 20 to be in a certain state in order to be executable and modifies the system state when executed. The system 20 is controlled by plan p (54) that is comprised of a sequence of actions $a_1, a_2, \ldots, a_n$ drawn from the set A of possible actions. Execution of an action potentially changes the system state, and part of the system state may represent the state of a product 52 at any given time, particularly if the action is part of a production plan 54. Further, internal constraints of the system 54 limit the set of plans 54 to a subset of all possible sequences (e.g., the plan space 100 in FIG. 14 above). Moreover, the execution of actions of a given plan p in the system 20 may result in only a single observable plan outcome or observation O (e.g., observation 56 from sensor 26).

One type of observable outcome 26 is defined as abnormal, denoted ab(p), in which the plan 54 fails to achieve its production goal. Another type is a normal (not abnormal) outcome, denoted ¬ab(p) in which the plan 54 achieves the associated production goal. In the exemplary control system 2, information about the plant 20 may be represented by the diagnosis engine's belief in various possible hypotheses, constituted in the belief model 42, where such a hypothesis h is an assignment of abnormal or normal to each of the system actions e.g., $h=[ab(a_1), \neg ab(a_2), \ldots, ab(a_n)]$. In the example case of a fault in a single plant resource/component (single fault case), exactly one action will be abnormal. Defining $H_{SYS}$ as a set of all hypotheses excluding a single hypothesis (a "no fault" hypothesis $h_0$) for the situation where all actions are normal, every hypothesis is a complete assignment of abnormality to each action, and all are unique and mutually exclusive (e.g., $\forall h_i, h_j \in H_{sys}, h_i \neq h_j$). The system's beliefs in the belief model 42 can be represented as a probability distribution over the hypothesis space $H_{sys}$, Pr(H), where the belief model 42 is updated by the diagnosis engine 40 from past observations 56 using Bayes' rule to get a posterior distribution over the unknown hypothesis H given observation O and plan P: $Pr(H|O, P) = \alpha Pr(O|H, P) Pr(H)$.

A plan p is deemed by the diagnosis engine 40 and the planner 30 as being informative if it contributes information to (e.g., reduces the uncertainty of) the diagnosis engine's beliefs 42, where the informative value can be measured as the mutual information between the system beliefs Pr(H) and the plan outcome conditioned on the plan executed, I(H; O|P=p). This mutual information may be defined in terms of entropy or uncertainty implied by a probability distribution, where a uniform probability distribution has high uncertainty and a deterministic distribution has low uncertainty. In the context of diagnostic information value, an informative plan 54 reduces the uncertainty of the system's beliefs 42, and thus plans 54 with outcomes that are hard to predict are the most informative, while execution of plans 54 that are known to succeed (or known to fail) will yield no diagnostic information gain. In this respect, an optimal (e.g., 'target') uncertainty T may be used to rate the plans 54 with respect to expected informative value, by which the diagnosis engine 40 can evaluate plans 54 accordingly and provide the expected information gain data 70 to the planner 30 to influence the plan selection/generation for preferential selection/generation of informative plans 54.

In the case of persistent single faults, a value of T=0.5 can be use as the optimal uncertainty about the outcome, and uncertainty in the case of intermittent faults may be maximized in the range of about $0.36 \leq T \leq 0.5$ in one exemplary implementation. In finding a plan 54 with a given amount of uncertainty T, the diagnosis engine 40 is operative to predict the uncertainty associated with a given plan $p=[a_1, a_2, \ldots, a_n]$, where the set of unique actions in a plan $A_p = U_i\{a_i \in p\}$. Presuming f failures are observable, a plan 54 will be abnormal ab(p) if one or more of its actions are abnormal, as set forth in the following equation (1):

$$ab(a_1) \lor \ldots \lor ab(a_n) \Rightarrow ab(p) \text{ for } a_i \in A_p \qquad (1)$$

where $a_i \in A_p$, and p is the plan. The predicted probability of an action of a plan 54 being abnormal will be a function of the probability assigned to all relevant hypotheses, where the set of hypotheses that influence the uncertainty of the outcome of plan p is denoted $H_p$ and is defined in the following equation (2):

$$H_p = \{h | h \in H_{sys} \text{ and } h \Rightarrow ab(a), a \in A_p\}. \qquad (2)$$

Given a distribution over hypotheses and the set Hp of explanatory hypotheses for a given plan p, it is possible to calculate the probability that plan p will fail. Since every hypothesis $h \in H_p$ contains at least one abnormal action that is also in plan p, hypothesis h being true implies ab(p):

$$(h_1 \lor h_2 \lor \ldots \lor h_m) \Leftrightarrow ab(p) \text{ where } h_j \in H_p \qquad (3)$$

Since the hypotheses are mutually exclusive by definition, the probability of a plan failure Pr(ab(p)) can be defined as the sum of all probabilities of hypotheses which imply that the plan will fail, as in the following equation (4):

$$Pr(ab(p)) = \sum_{h \in H_p} Pr(h) \qquad (4)$$

To find a plan which achieves production goals while also being informative, the planner 30 evaluates the plans 54 in terms of the probability T and uses this and the current plant state 58 to preferentially construct a plan 54 that achieves a production goal while having a positive probability of failure. While in the short term this may likely lower the productivity of the system 20, the information gained allows improvement in long term productivity. The planner 30, moreover, may construct a sequence of plans 54 for execution in the plant 20 which might not be maximally informative individually, but are maximally informative taken jointly.

As noted above, any form of search may be employed in the planner 30 that piece-wise selects/generates from suitable plans that will achieve a given production goal while yielding useful diagnostic information within the scope of the present disclosure. A simple brute force search could be employed to generate all possible action sequences and the resulting list could be filtered to yield plans 54 that achieve production goals while being informative, as per the following equation (5):

$$p^{opt} = \operatorname{argmin}_{achievesGoal(p) \in P} |Pr(ab(p)) - T|. \qquad (5)$$

However, this may be impractical in real-time control applications if the space of plans P is very large. Another possible approach employed in the exemplary system 2 is for the diagnosis engine 40 to establish a heuristic by which the planner 30 considers sets or families of plans 54 that share structure, such as by employing an A* target search using a set of partial plans $p_{I \to S_1}, p_{I \to S_2}, \ldots, p_{I \to S_n}$ which progress from an initial state I to intermediate states $S_1, S_2, \ldots, S_n$. In this approach, for each step, the planner 30 uses the A* target search to attempt to expand the plan most likely to achieve the production goal in the best (e.g., most informative) way. An ideal plan p in this regard would start with the prefix $p_{I \to S_n}$ which takes the system 20 to a state $S_n$ and continues with the suffix plan $p_{S_n \to G}$ leading from the state $S_n$ to the goal state G. This A* technique chooses the partial plan $p_{I \to S_n}$ to expand using a heuristic function $f(S_n)$ provided by the diagnosis engine 40 which estimates the total path quality as the quality of the plan prefix $p_{I \to S_n}$ (written as $g(S_n)$), plus the predicted quality of the suffix $p_{S_n \to G}$, (written as $h(S_n)$), per the following equation (6):

$$f(S_n) = g(S_n) + h(S_n). \qquad (6)$$

If the heuristic function $f(S_n)$ never overestimates the true quality of the complete the plan, then the heuristic $f(S_n)$ is said to be admissible and an A* target search by the planner 30 should return an optimal plan 54. In this regard, the underestimation causes the A* search approach to be optimistic in the face of uncertainty, thereby ensuring that uncertain plans are explored before committing to completed plans known to be high in quality. As a result, the more accurate the heuristic function is, the more the A* target search focuses on the highly informative plans 54. In the illustrated embodiments, therefore, the planner 30 employs a heuristic function derived by the diagnosis engine 40 based at least partially on the description of the system architecture and dynamics in the plant model 50.

FIG. 17 shows an exemplary state/action diagram 400 depicting possible plans for transitioning the system state from a starting state S to a goal state G in the plant 20. In this example, the system state nodes 402 include the starting state S 402s, the goal stage G 402g, and four intermediate states 402a-402d for nodes A-D, respectively. A given plan 54 for this example proceeds by following actions 404 through the diagram 400 to ultimately reach the goal G 402g. One possible plan 54 that satisfies such a production goal moves the system through the state sequence [S, A, C, G] through actions 404sa, 404ac, and 404cg as shown in FIG. 17. Assuming for illustrative purposes that this plan 54 results in an abnormal outcome caused by a faulty action 404ac between nodes A and C (action $a_{A,C}$), caused by a single persistent fault in one of the system resources 21-24, the diagnosis engine 40 would determine from the plan 54 and the resulting fault observation 56 that all of the actions 404sa, 404ac, and 404cg along the plan path are (without further information) suspected of being faulty. Since a single persistent fault is assumed, there are three positive probability hypotheses corresponding to the suspected actions $\{\{a_{S,A}\}, \{a_{A,C}\}, \{a_{C,G}\}\}$. Absent additional information, the diagnosis engine 40 initially assigns equal probabilities $\{⅓\}, \{⅓\}, \{⅓\}$ to these suspected actions.

The diagnosis engine 40 uses the graph structure and probability estimates to construct heuristic bounds on the uncertainty that can be contributed to a plan by any plan suffix, in this example, by building up the heuristic from right to left in FIG. 17. In particular, the exemplary diagnosis engine 40 assigns lower and upper bounds [L,U] to the nodes 402, as shown in FIG. 17, and these bound values are sent to the planner 30 in one implementation. As an illustrative example, the action $a_{D,G}$ leading from state D to the goal state G in FIG. 13 was not part of the observed plan 54 that failed, and is therefore not a candidate hypothesis, and this action has a zero probability of being the source of the assumed single persistent system fault. Consequently, extending any prefix plan 54 ending in state D with action $a_{D,G}$ will not increase the failure probability of the extended plan 54, because the action $a_{D,G}$ has probability zero of being abnormal. In this example, moreover, there are no other possible plans 54 from D to G, so both the upper and lower bound for any plan ending in state D is zero, and the node D is thus labeled [0,0] in FIG. 7. State B 402b likewise has a lower bound of zero as plans 54 passing through state B can be completed by an action $a_{B,D}$ 404bd that does not use a suspected action 404 and ends in state D which has a zero lower bound. State B in this example has an upper bound of ⅓ since it can be completed by an unsuspected action $a_{B,C}$ 404bc to state C 402c which in turn has both upper and lower bounds with ⅓ probability of being abnormal. The diagnosis engine 40 continues this analysis recursively to determine bounds on the probability of a suffix sub-plan being abnormal, and sends these as part of the information gain data 70 to the planner 30.

The planner 30 uses these bounds with a forward A* target search to identify and construct a plan 54 that achieves or most closely approximates the target probability T. For example, one possible plan 54 begins from the start node S 402s and includes a first action $a_{S,A}$, which was part of the plan 54 that was observed to be abnormal. If the action $a_{S,A}$ 404ac is added to a partial plan, it must add ⅓ probability to the chance of failure as it is a candidate itself. After $a_{S,A}$, the system 20 would be in state A, and a plan 54 could be completed through D by including actions 404ad and 404dg to arrive at the goal state G 402g. The action $a_{A,D}$ itself has a zero probability of being abnormal since it was not involved in the previously observed faulty plan. Using the heuristic bound, therefore, a completion through state node D 402d adds zero probability of being abnormal. From node A 402a, a plan 54 could alternatively be completed through node C, as in the originally observed plan 54. The corresponding action $a_{A,C}$ 404ac adds ⅓ probability of failure to such a plan and based on the heuristic bound the completion through C 402c must add another ⅓ probability of being abnormal.

The heuristic that is precomputed and provided by the diagnosis engine 40 therefore allows prediction of total plan abnormality probability for a possible plan 54 that moves the system 20 through the state node sequence [S, A, C, G] or [S, A, D, G]. The lower bound of the total plan is ⅓, as determined by ⅓ from $a_{S,A}$ plus 0 from the completion $a_{A,D}, a_{D,G}$, and the upper bound is ⅔ equal to the sum of ⅓ from $a_{S,A}$ plus ⅓ each from $a_{A,C}$ and $a_{C,G}$. If this plan is computed through $[a_{A,C}, a_{C,G}]$ the total plan 54 will fail with probability 1, and therefore nothing is to be learned from constructing such a plan completion. If the plan 54 is instead completed through the suffix $[a_{A,D}, a_{D,G}]$ the failure probability of the total plan will be ⅓ which is closer to the optimally informative probability T=0.5. In this case, the planner 30 will construct the plan 54 [S, A, D, G] for execution in the plant 20. The plan 54 may or may not succeed, and in either case something may be learned from a diagnostic perspective. For instance, if the plan [S, A, D, G] fails, the diagnosis engine 40 learns that node $a_{S,A}$ was the failed action (for the assumed single persistent fault scenario), and if the plan 54 is successful, the engine 40 can further refine the belief model 42 by eliminating action 404sa as a fault suspect.

It is noted that there is no guarantee that a plan 54 exists for any given value between the bounds. The diagnosis engine 40 recursively calculates the heuristic bounds starting from all goal states, where a goal state has an empty set of suffix plans $p_{G \to G}=\emptyset$ and therefore has a set lower bound $L_G=0$ and a set upper bound $U_G=0$. For each new state $S_m$, the diagnosis engine 40 calculates the corresponding bounds based at least partially on the bounds of all possible successor states SUC $(S_m)$ and the failure probability of the connecting action $a_{Sm, Sn}$ between $S_m$ and a successor state $S_n$. In this regard, a successor state $S_n$ of a state $S_m$ is any state that can be reached in a single step starting from the state $S_m$. In the case where a single fault is assumed, the failure probability added to a plan $p_{I \to S_m}$ by concatenating an action $a_{S_m, S_n}$, is independent from the plan $p_{I \to S_m}$ if $H_{PI \to S_m} \cap H_{a_{sm,sn}}=\emptyset$. The diagnosis engine 40 determines the lower bound for $S_m$ by the action probabilities linking $S_m$ to its immediate successors and the lower bounds on these successors, and the diagnosis engine 40 computes the upper bounds in analogous fashion with $L_{Sm}=$ $\min_{Sn \in SUC(Sm)}[\Pr(ab(a_{Sm,Sn}))+L_{Sn}]$, and $U_{Sm}=$ $\max_{Sn \in SUC(Sm)}[\Pr(ab(a_{Sm,Sn}))+U_{Sn}]$.

In contrast to the computation of the heuristic in the diagnosis engine 40, the search for an informative production plan by the planner 30 starts from the initial starting state S 402a and works recursively forward toward the goal state 402g. The abnormality probability of the empty plan starting at the initial state S is zero plus the best completion. In general, the planner 30 computes the abnormality probability as the plan probability up to the current state plus the abnormality probability of the best completion route. Since the planner 30 is initially uncertain about the completion, its probability of abnormality is an interval that includes a lower and upper bound and the values in between. As a result, the total abnormality probability is also an interval, as set forth in the following equation (7):

$$I(p_{I \to Sn})=[\Pr(ab(p_{I \to Sn}))+L_{Sn}, \Pr(ab(p_{I \to Sn}))+U_{Sn}] \quad (7)$$

As noted above, the most informative plan 54 is one whose total failure probability is T, with T=0.5 in a preferred implementation for an assumed persistent single fault. Given an interval describing bounds on the total abnormality probability of a plan $I(p_{I \to S_n})$, the planner 30 can therefore construct an interval describing how close the abnormality probabilities will be to T according to the following equation (8):

$$|T-I(p_{I \to S_n})| \quad (8)$$

This absolute value in equation (8) folds the range around T, and if the estimated total abnormality probability of the plan 54 straddles target probability T, then the interval $|T-I(p_{I \to S_n})|$ straddles zero and the interval will range from zero to the absolute max of $I(p_{I \to S_n})$. The exemplary planner 30 uses a search heuristic $F(p_{I \to S_n})=\min(|T-I(p_{I \to S_n})|)$ provided by the diagnosis engine 40 as part of the expected information gain data 70, although other heuristics are contemplated within the scope of the disclosure which allow target searching to construct plans 54 having high relative informative value. The exemplary function F has some advantageous properties. For example, whenever the predicted total plan abnormality probability lies between L and U, F is zero. Also, plans 54 may exist whose abnormality probability exactly achieves the target probability T. Moreover, in all cases $F(p_{I \to S_n})$ represents the closest any plan that goes through a state $S_n$ can come to the target abnormality probability exactly T.

The planner 30 can search from a whole set of partial plans $P=\{p_{I \to S_1}, p_{I \to S_2}, \ldots, p_{I \to S_n}\}$ (e.g., stored in the planner 30, the data store 36, or elsewhere in the system 2 or in an external data store accessible by the planner 30). For each partial plan, the planner 30 evaluates $F(p_{I \to S_n})$ and expands the plan with the lowest value. Since $F(p_{I \to S_n})$ is an underestimate, an A* search using this estimate will return the most informative plan that achieves production goals.

In a further aspect of the disclosure, the planner 30 may be operative to improve the efficiency of the target plan search using selective pruning. In this regard, the above described search heuristic in many cases may return the same value, i.e., zero, which provides the planner 30 with little guidance in making a selection. The planner 30 may accordingly be adapted to focus the search using one or more techniques. In a first focusing approach, the planner 30 prunes out dominated parts of the search space. For example, a given partial plan $I(p_{I \to S_n})$ may be identified by the planner 30 having an abnormality probability interval that does not straddle the target value T. The best possible plan in this interval will be on the one of the two boundaries of the interval that is closest to the target value T. For instance, let $L_I(p_{I \to S_n})$ and $U_I(p_{I \to S_n})$ be the lower and upper bound of the abnormality probability interval $I(p_{I \to S_n})$. The planner 30 determines the value of the best plan $V_{PI \to S_n}$ in such cases according to the following equation (9):

$$V_{PI \to S_n} = \min(|L_{I(PI \to S_n)} - T|, |U_{I(PI \to S_n)} - T|) \quad (9)$$

The plan $p_{I \to S_i}$ will dominate every plan $p_{I \to S_j}$ where $V_{PI \to S_i} < V_{PI \to S_j} \wedge T \notin I(p_{I \to S_j})$. The planner 30 accordingly operates to prune out (eliminate from further consideration) some or preferably all dominated plans from the A* search space.

In another aspect of the disclosure, the planner 30 may employ other focusing techniques to intelligently break ties in the heuristic value. As noted above, the heuristic value determines which state node will be expanded next, but it is possible that two or more nodes will receive the same heuristic value. Accordingly, the planner 30 may employ one or more rules to break the tie and hence to determine which node should be expanded first. One suitable rule in this regard is to simply pick a node randomly.

A further improvement can be implemented in the planner 30 according to this aspect of the disclosure, using the fact that $V_{PI \to S_n}$ (in equation (9) above) represents a guaranteed lower bound on a total plan $p_{I \to G}$ starting with the partial plan $p_{I \to S_n}$ as prefix. While the upper and lower bounds are realizable, none of the interior points of the interval are guaranteed to exist. Therefore, the planner 30 may advantageously compare the V's in order to decide which of two partial plans has the closest realizable solution to break the above mentioned ties. Moreover, if two partial plans are also identical in this parameter, the information gain is the same, and thus the planner 30 is operative to choose the partial plan that has less likelihood to fail, thereby facilitating short term productivity. The planner 30 is in this embodiment may combine these two approaches in a sequential decision procedure. For example, if $p_{I \to S_1}$ and $p_{I \to S_2}$ are two partial plans with the same minimum value, i.e. $F(p_{I \to S_1})=F(p_{I \to S_2})$, the planner 30 will break the tie by choosing the first rule that applies from the following ordered list:

1 If $V_{PI \to S_1} < V_{PI \to S_2}$ then expand $p_{I \to S_1}$ first;
2 If $V_{PI \to S_1} > V_{PI \to S_2}$ then expand $p_{I \to S_2}$ first;
3 If $U_I(p_{I \to S_1}) < U_I(p_{I \to S_2})$ then expand $p_{I \to S_1}$ first;
4 If $U_1(p_{I \to S_1}) > U_1(p_{I \to S_2})$ then expand $p_{I \to S_2}$ first;
5 if $L_I(p_{I \to S_1}) < L_I(p_{I \to S_2})$ then expand $p_{I \to S_2}$ first;
6 If $L_I(p_{I \to S_1}) > L_I(p_{I \to S_2})$ then expand $p_{I \to S_1}$ first;
7 otherwise pick randomly.

The planner 30 can also facilitate the selective avoidance of known faulty resources 21-24 in the plant 20 via the component 32b, as well as generation of plans 54 so as to help determine the source of faults observed during production. For example, the planner 30 operating the above described modular printing system plant 20 of FIG. 12 can be influenced by diagnostic objectives 34b (FIG. 13) to preferentially construct paper paths via appropriate routing of substrates to use different subsets of routing and printing components 24 and 22, where a given sequence of these paths can be used to isolate the cause of an observed fault. Moreover, multiple plant pathways, redundancy of plant resources, and the capability to operate resources at different speeds, voltage levels, temperatures, or other flexibility in setting operational parameters of the plant resources allows the planner 30 to tailor active production plan generation for intelligent diagnostic information gain despite lack of complete sensor coverage in a given plant 20. In this manner, the modularity and flexibility of a given system 20 can be exploited by the pervasive diagnostic features of the control system 2 to facilitate diagnostic objectives 34b while also providing benefits with regard to flexibility in achieving production goals.

The control system 2 can thus provide the advantages of performing diagnosis functions during production, even with limited sensor capabilities, with the flexibility to schedule dedicated diagnostic plans 54 if/when needed or highly informative. In the case of explicit dedicated diagnosis, the planner 30 focuses on the needs of the diagnosis engine 40 and thus creates/selects plans 54 that maximize information gain with respect to the fault hypotheses. The system 2 also allows the generation of plans 54 solely on the basis of production goals, for instance, where there is only one plan 54 that can perform a given production task and the planner 30 need not chose from a set of equivalent plans, thereby limiting the information gathering to the case of passive diagnosis for that plan.

In the exemplary modular printing system example 20 above, therefore, the control system 2 can choose to parallelize production to the extent possible, use specialized print engines 22 for specific printing tasks, and have the operational control to reroute sheet substrates around failed modules as these are identified. In this implementation, the planner 30 may receive a production print job 51 from a job queue (in the producer 10, or a queue in the planner 30), and one or more plans 54 are constructed as described above to implement the job 51. The observations 56 are provided to the diagnosis engine 40 upon execution of the plan(s) 54 to indicate whether the plan 54 succeeded without faults (e.g., not abnormal), or whether an abnormal fault was observed (e.g., bent corners and/or wrinkles detected by the sensors 26 in printed substrates). The diagnosis engine 30 updates the hypothesis probabilities of the belief model 42 based on the executed plan 54 and the observations 56. When a fault occurs, the planner 30 constructs the most informative plan 54 in subsequent scheduling so as to satisfy the diagnostic objectives 34b. In this regard, there may be a delay between submitting a plan 54 to the plant 20 and receiving the observations 56, and the planner 30 may accordingly plan production jobs 51 from the job queue without optimizing for information gain until the outcome is returned in order to maintain high short term productivity in the plant 20.

Using the above described pervasive diagnosis, the plan construction in the planner 30 is biased to have an outcome probability closest to the target T, and this bias can create paths capable of isolating faults in specific actions. Prior to detection of a system fault, the plant 20 may produce products 52 at a nominal rate $r_{nom}$, with diagnosis efforts beginning once some abnormal outcome is observed. The length of time required to diagnose a given fault in the system (e.g., to identify faulty plant components or resources 21-24) will be short if dedicated, explicit diagnostic plans 54 are selected, with pervasive diagnosis approaches taking somewhat longer, and passive diagnostic techniques taking much longer and possibly not being able to completely diagnose the problem(s). With regard to diagnosis cost, however, explicit dedicated diagnosis results in high production loss (production is halted), while purely passive diagnosis incurs the highest expected repair costs due to its lower quality diagnosis. The pervasive diagnosis aspects of the present disclosure advantageously integrate diagnostic objectives 34b into production planning by operation of the planner 30, and therefore facilitate realization of a lower minimal total expected production loss in comparison to passive and explicit diagnosis.

The passive diagnostic aspects of the disclosure, moreover, are generally applicable to a wide class of production manufacturing problems in which it is important to optimize efficiency but the cost of failure for any one job is low compared to stopping the production system to perform explicit diagnosis. In addition, the disclosure finds utility in association with non-manufacturing production systems, for example, service industry organizations can employ the pervasive diagnostic techniques in systems that produce services using machines, software, and/or human resources. Moreover, the disclosure is not limited to a probability based A* search, wherein other plan construction techniques can be employed such as a SAT-solver approach in which the clauses represent failed plans and each satisfying assignment is interpreted as a valid diagnosis.

The above examples are merely illustrative of several possible embodiments of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several embodiments, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising". It will be appreciated that various of the above-disclosed and other features and functions, or alternatives thereof, may be desirably combined into many other different systems or applications, and further that various presently unforeseen or unanticipated alternatives, modifications, variations or improvements therein may be subsequently made by those skilled in the art which are also intended to be encompassed by the following claims.

The invention claimed is:

1. A method for identifying at least one path having a value closest to a target value, the method comprising:
    providing a starting graph with a plurality of nodes and a plurality of edges between pairs of nodes, each edge having at least one positive directional weight value, the nodes individually comprising at least one property value and representing a physical location or an operational state of a machine or system;
    constructing a successor graph based at least partially on the starting graph and a start node;
    constructing a predecessor graph based at least partially on the starting graph and at least one goal node;
    constructing a connection graph based at least partially on the successor and predecessor graphs;
    determining upper and lower bound values for each given node of the connection graph based at least partially on the weight values of all remaining paths from the given node to the at least one goal node; and
    performing a best first search using the upper and lower bound values to identify at least one path from the start node to the goal node having a path value closest to a non-zero target value.

2. The method of claim 1, wherein the connection graph is constructed as the intersection of the successor and predecessor graphs.

3. The method of claim 2, wherein determining upper and lower bounds values for each given node of the connection graph comprises:
    initializing the upper and lower bound values of the at least one goal node to zero; and
    propagating backward from the goal node to the start node, determining an upper bound value $U_{Sm}$ and a lower bound value $L_{Sm}$ along incoming edges to each given node n in the connection graph from the given node's predecessor nodes m according to the equations:

$$L_{S_m} = \min_{S_n \in SUC(S_m)} [v(a_{S_m,S_n}) + L_{S_n}]$$

$$U_{S_m} = \max_{S_n \in SUC(S_m)} [v(a_{S_m,S_n}) + U_{S_n}]$$

where $v(a_{SM,SN})$ is the at least one directional weight value of the edge from the predecessor node m to the given node n.

4. The method of claim 3, wherein performing the best first search comprises:
    searching forward from the start node to the goal node, performing a node evaluation for each given node n according to the following node evaluation:
    (1) generating a set of successor nodes for each given node n;
    (2) for each successor node of a given set, determining the successor node value $T'_{PI \to S_n} = T - v(p_{I \to S_n})$, where $v(p_{I \to S_n})$ is the weight value of the edge from the given node n to the given successor node and T is the target value;

(3) for each successor node of a given set, evaluating a function F using an upper bound value $U_{Sm}$ and a lower bound value $L_{Sm}$ of the successor node as follows:

$$F(p_{I \to S_n}) = \begin{cases} 0: & \Delta T'_{p_{I \to S_n}} \text{ in a range } [L(S_n), U(S_n)] \\ \min \begin{pmatrix} |T'_{p_{I \to S_n}} - L(S_n)|, \\ |T'_{p_{I \to S_n}} - U(S_n)| \end{pmatrix}: & \text{otherwise,} \end{cases}$$

where $\Delta T'_{PI \to S_n} = [T'_{PI \to S_n}, T'_{PI \to S_n}]$;

(4) retaining all evaluated successor nodes in a list where all nodes are sorted by their outcome of function F; and (5) selecting one node with a minimal function F value and continuing with step (1) until the selected node is a goal node to identify at least one path from the start node to the goal node having a path value closest to a non-zero target value based at least partially on the successor node sets.

5. The method of claim 1, wherein determining upper and lower bounds values for each given node of the connection graph comprises:

initializing the upper and lower bound values of the at least one goal node to zero; and propagating backward from the goal node to the start node, determining an upper bound value $U_{Sm}$ and a lower bound value $L_{Sm}$ along incoming edges to each given node n in the connection graph from the given node's predecessor nodes m according to the equations:

$$L_{S_m} = \min_{S_n \in SUC(S_m)} [v(a_{S_m, S_n}) + L_{S_n}]$$

$$U_{S_m} = \max_{S_n \in SUC(S_m)} [v(a_{S_m, S_n}) + U_{S_n}]$$

where $v(a_{SM,SN})$ is the at least one directional weight value of the edge from the predecessor node m to the given node n.

6. The method of claim 5, wherein performing the best first search comprises:

propagating forward from the start node to the goal node, performing a node evaluation for each given node n according to the following node evaluation:

(1) generating a set of successor nodes for each given node n;

(2) for each successor node of a given set, determining the successor node value $T'_{PI \to S_n} = T - v(p_{I \to S_n})$, where $v(p_{I \to S_n})$ is the weight value of the edge from the given node n to the given successor node and T is the target value;

(3) for each successor node of a given set, evaluating a function F using an upper bound value $U_{Sm}$ and a lower bound value $L_{Sm}$ of the successor node as follows:

$$F(p_{I \to S_n}) = \begin{cases} 0: & \Delta T'_{p_{I \to S_n}} \text{ in a range } [L(S_n), U(S_n)] \\ \min \begin{pmatrix} |T'_{p_{I \to S_n}} - L(S_n)|, \\ |T'_{p_{I \to S_n}} - U(S_n)| \end{pmatrix}: & \text{otherwise,} \end{cases}$$

where $\Delta T'_{PI \to S_n} = [T'_{PI \to S_n}, T'_{PI \to S_n}]$;

(4) retaining all evaluated successor nodes in a list where all nodes are sorted by their outcome of function F; and (5) selecting one node with the minimal function F value and continuing with step (1) until the selected node is a goal node to identify at least one path from the start node to the goal node having a path value closest to a non-zero target value based at least partially on the successor node sets.

7. The method of claim 1, wherein performing the best first search comprises:

propagating forward from the start node to the goal node, performing a node evaluation for each given node n according to the following node evaluation:

(1) generating a set of successor nodes for each given node n, (2) for each successor node of a given set, determining the successor node value $T'_{PI \to S_n} = T - v(p_{I \to S_n})$, where $v(p_{I \to S_n})$ is the weight value of the edge from the given node n to the given successor node and T is the target value, (3) for each successor node of a given set, evaluating a function F using an upper bound value $U_{Sm}$ and a lower bound value $L_{Sm}$ of the successor node as follows:

$$F(p_{I \to S_n}) = \begin{cases} 0: & \Delta T'_{p_{I \to S_n}} \text{ in a range } [L(S_n), U(S_n)] \\ \min \begin{pmatrix} |T'_{p_{I \to S_n}} - L(S_n)|, \\ |T'_{p_{I \to S_n}} - U(S_n)| \end{pmatrix}: & \text{otherwise,} \end{cases}$$

where $\Delta T'_{PI \to S_n} = [T'_{PI \to S_n}, T'_{PI \to S_n}]$;

(4) retaining all evaluated successor nodes in a list where all nodes are sorted by their outcome of function F; and (5) selecting one node with the minimal function F value and continuing with step (1) until the selected node is a goal node to identify at least one path from the start node to the goal node having a path value closest to a non-zero target value based at least partially on the successor node sets.

8. The method of claim 7, wherein performing a node evaluation for each given node n further comprises selectively pruning the set of successor nodes to speed up the best first search.

9. A system for identifying at least one path having a value closest to a target value in a starting graph that includes a plurality of nodes representing a physical location or an operational state of a machine or system and having at least one property value, and a plurality of edges between pairs of nodes, each edge having at least one positive directional weight value, the system comprising:

at least one processor: and a target value search component implemented using the at least one processor, comprising:

a graph construction component implemented using the at least one processor, and operative to construct a connection graph based at least partially on the starting graph, a start node, and at least one goal node,
a computation component implemented using the at least one processor, and operative to determine upper and lower bound values for each given node of the connection graph based at least partially on the weight values of all paths from the given node to the at least one goal node; and
a search component implemented using the at least one processor, and operative to perform a best first search using the upper and lower bound values to identify at least one path from the start node to the goal node having a path value closest to a non-zero target value.

10. The system of claim 9, wherein the graph construction component is operative to construct a successor graph based at least partially on the starting graph and the start node, to construct a predecessor graph based at least partially on the starting graph and the at least one goal node, and to construct the connection graph as the intersection of the successor and predecessor graphs.

11. The system of claim 9, wherein the computation component is operative to initialize the upper and lower bound values of the at least one goal node to zero, and propagating backward from the goal node to the start node, to determine an upper bound value $U_{S_m}$ and a lower bound value $L_{S_m}$ along incoming edges to each given node n in the connection graph from the given node's predecessor nodes m according to the equations:

$$L_{S_m} = \min_{S_n \in SUC(S_m)} [v(a_{S_m, S_n}) + L_{S_n}]$$

$$U_{S_m} = \max_{S_n \in SUC(S_m)} [v(a_{S_m, S_n}) + U_{S_n}]$$

where $v(a_{S_M,S_N})$ is the at least one directional weight value of the edge from the predecessor node m to the given node n.

12. The system of claim 11, wherein the search component is operative to perform a node evaluation for each given node n propagating forward from the start node to the goal node, according to the following node evaluation by
(1) generating a set of successor nodes for each given node n,
(2) for each successor node of a given set, determining the successor node value $T'_{P_I \to S_n} = T - v(p_{I \to S_n})$, where $v(p_{I \to S_n})$ is the weight value of the edge from the given node n to the given successor node and T is the target value,
(3) for each successor node of a given set, evaluating a function F using an upper bound $U_{S_m}$ and a lower bound $L_{S_m}$ of the successor node as follows:

$$F(p_{I \to S_n}) = \begin{cases} 0: & \Delta T'_{p_{I \to S_n}} \text{ in a range } [L(S_n), U(S_n)] \\ \min\begin{pmatrix} |T'_{p_{I \to S_n}} - L(S_n)|, \\ |T'_{p_{I \to S_n}} - U(S_n)| \end{pmatrix}: & \text{otherwise,} \end{cases}$$

where $\Delta T'_{P_I \to S_n} = [T'_{P_I \to S_n}, T'_{P_I \to S_n}]$,
(4) retaining all evaluated successor nodes in a list where all nodes are sorted by their outcome of function F, and
(5) selecting one node with the minimal function F value and continuing with step (1) until the selected node is a goal node to identify at least one path from the start node to the goal node having a path value closest to a non-zero target value.

13. The system of claim 12, wherein the search component comprises a pruning component implemented using the at least one processor, and operative to selectively prune the set of successor nodes to speed up the best first search.

14. The system of claim 9, wherein the search component is operative to perform a node evaluation for each given node n propagating forward from the start node to the goal node, according to the following node evaluation by
(1) generating a set of successor nodes for each given node n,
(2) for each successor node of a given set, determining the successor node value $T'_{P_I \to S_n} = T - v(p_{I \to S_n})$, where $v(p_{I \to S_n})$ is the weight value of the edge from the given node n to the given successor node and T is the target value,
(3) for each successor node of a given set, evaluating a function F using an upper bound $U_{S_m}$ and a lower bound $L_{S_m}$ of the successor node as follows:

$$F(p_{I \to S_n}) = \begin{cases} 0: & \Delta T'_{p_{I \to S_n}} \text{ in a range } [L(S_n), U(S_n)] \\ \min\begin{pmatrix} |T'_{p_{I \to S_n}} - L(S_n)|, \\ |T'_{p_{I \to S_n}} - U(S_n)| \end{pmatrix}: & \text{otherwise,} \end{cases}$$

where $\Delta T'_{P_I \to S_n} = [T'_{P_I \to S_n}, T'_{P_I \to S_n}]$,
(4) retaining all evaluated successor nodes in a list where all nodes are sorted by their outcome of function F, and
(5) selecting one node with the minimal function F value and continuing with step (1) until the selected node is a goal node to identify at least one path from the start node to the goal node having a path value closest to a non-zero target value.

15. The system of claim 14, wherein the search component comprises a pruning component implemented using the at least one processor, and operative to selectively prune the set of successor nodes to speed up the best first search.

16. The system of claim 9:
wherein the starting graph is a belief model of a diagnosis engine of a model-based control system for constructing plans for operating a production plant to achieve one or more production goals, the starting graph including a plurality of nodes representing a state of the production plant and a plurality of edges representing actions by one or more plant resources to transition the plant state from one graph node to another, each edge having at least one positive directional weight value defining a failure probability associated with the action having a value between 0 and 1 inclusive;
wherein the target value search component is incorporated into the diagnosis engine and the search component performs a best first search to identify at least one production plan to achieve a given production goal that has a failure probability value closest to a non-zero target value.

17. The system of claim 16, wherein the target value is 0.5.

18. The system of claim 9, wherein the system is a consumer search system.

* * * * *